(12) United States Patent
Davis

(10) Patent No.: US 7,664,031 B2
(45) Date of Patent: Feb. 16, 2010

(54) WIRELESS PROBE

(75) Inventor: Mark Davis, Wicklow (IE)

(73) Assignee: Dublin Institute of Technology, Dublin (IE)

( * ) Notice: Subject to any disclaimer, the term of this patent is extended or adjusted under 35 U.S.C. 154(b) by 695 days.

(21) Appl. No.: 10/949,901

(22) Filed: Sep. 24, 2004

(65) Prior Publication Data

US 2005/0276276 A1 Dec. 15, 2005

(51) Int. Cl.
*H04J 1/16* (2006.01)

(52) U.S. Cl. .................. 370/235; 370/230; 709/224; 709/232

(58) Field of Classification Search .............. 370/252, 370/254, 235, 230, 329, 338, 448, 432, 445, 370/468, 447, 465, 458; 709/232, 224, 230
See application file for complete search history.

(56) References Cited

U.S. PATENT DOCUMENTS

| | | | |
|---|---|---|---|
| 4,021,807 A | | 5/1977 | Culpepper et al. |
| 4,630,254 A | | 12/1986 | Tseng |
| 4,809,257 A | | 2/1989 | Gantenbein et al. |
| 5,054,873 A | | 10/1991 | Davis et al. |
| 5,191,459 A | | 3/1993 | Thompson et al. |
| 5,247,381 A | | 9/1993 | Olmstead et al. |
| 5,510,917 A | | 4/1996 | Corke et al. |
| 5,526,161 A | | 6/1996 | Suzuki et al. |
| 5,583,517 A | | 12/1996 | Yokev et al. |
| 5,644,576 A | * | 7/1997 | Bauchot et al. ............. 370/437 |
| 5,664,066 A | | 9/1997 | Sun et al. |
| 5,815,298 A | | 9/1998 | Cern |
| 5,818,619 A | | 10/1998 | Medved et al. |
| 5,890,055 A | | 3/1999 | Chu et al. |
| 6,339,707 B1 | | 1/2002 | Wainfan et al. |
| 6,738,819 B1 | * | 5/2004 | Li et al. ........................ 709/229 |
| 6,801,756 B1 | * | 10/2004 | Agrawal et al. ........... 455/67.11 |
| 6,965,942 B1 | * | 11/2005 | Young et al. ................. 709/232 |
| 2003/0235209 A1 | * | 12/2003 | Garg et al. ................... 370/468 |
| 2004/0008627 A1 | * | 1/2004 | Garg et al. ................... 370/235 |
| 2005/0239474 A9 | * | 10/2005 | Liang ........................... 455/454 |

OTHER PUBLICATIONS

Yeo, Jihwang, Suman Banerjee, and Ashok Agrawala. *Measuring Traffic on the Wireless Medium: Experience and Pitfalls.* College Park: Department of Computer Science, University of Maryland, 2002.

Heusse, Martin, Franck Rousseau, Gilles Berger-Sabbatel, and Andrzej Duda. *Performance Anomaly of 802.11b.* Grenoble: LSR-IMAG Laboratory, 2003.

(Continued)

*Primary Examiner*—Jason E Mattis
*Assistant Examiner*—Dady Chery
(74) *Attorney, Agent, or Firm*—Nydegger & Associates

(57) ABSTRACT

The present invention relates to the field of wireless communications and more particularly to systems and methods for monitoring wireless traffic in wireless local area networks. The present invention addresses shortcomings of the prior art by providing methods and apparatus for the calculation of more meaningful performance values for a wireless network reflective of the consumption of time on the wireless medium. These performance values may then, for example, be used to control access to the network or displayed graphically to show a user the performance of the network.

58 Claims, 9 Drawing Sheets

OTHER PUBLICATIONS

*AiroPeek NX Real-Time, Expert Wireless LAN Analysis* [Manual]. Walnut Creek: WildPackets, Inc., 1989.

*Observer* [User Guide]. vol. 17: Network Instruments, pp. 96-250, 2002.

"AirMagnet Reporter." 2002-2004. AirMagnet, Inc. <http://www.airmagnet.com/products/reporter.htm>.

"Snifer Wireless." *Assuring Optimal Network Performance and Security*. 2002. Network Associates. <http://snifferwireless.com/uploads/Products/20046178370181/Wireless.Datasheet.FNL.lo.pdf>.

Combs, Gerald. *Ethereal Introduction*. Ethereal. <http://ww.ethereal.com/introduction.html.>.

"Commercial WLAN Analyzers." Jul. 20, 2004. Wi-Fi Planet. <http://www,wi-fiplanet.com/tutorials/article/php/3383451>.

"Open Source WLAN Analyzers." Jul. 20, 2004. Wi-Fi Planet. <http://www,wi-fiplanet.com/tutorials/print/php/3383441>.

* cited by examiner

WIRELESS PROBE

FIELD OF THE INVENTION

The present invention relates to the field of wireless communications and more particularly to systems and methods for monitoring wireless traffic in wireless local area networks.

BACKGROUND OF THE INVENTION

Wireless Local Area Networks (WLANs) have become extremely popular allowing users freedom to connect to a network without the inconvenience of a network cable. The market for wireless communications has grown significantly since the introduction of WLANs, and with the relative ease of integrating wireless access with existing network resources including printers, servers and Internet connections.

The most obvious differences between WLANs and wired networks such as Ethernet are those imposed by the transmission medium. Whereas Ethernet sends electrical signals through wires, WLANs send radio frequency energy through the air. Wireless devices are equipped with a special network interface card (NIC), having an antenna and a radio transceiver and associated circuitry for converting between the analog radio signals and the digitally encoded data.

The Institute of Electrical and Electronics Engineers (IEEE) 802.11 WLAN standard is by far the most popular and widely deployed wireless LAN (WLAN) technology. The original IEEE 802.11 standard was published in June 1997 and specified a physical layer (L1/PHY) and medium access control layer (L2/MAC) for interoperable WLAN operation. The original standard was intended to operate in the unlicensed Industrial, Scientific, and Medical (ISM) band at 2.4 GHz and supports a bit rate of 1 Mbps and an optional higher rate of 2 Mbps. In September 1999 the IEEE approved a HR or "high rate" extension to the standard, known as the IEEE 802.11b, which supports data rates up to 11 Mbps. More recently, another extension known as the IEEE 802.11a has emerged that supports data rates up to 54 Mbps but in a higher frequency ISM band at 5 GHz. Another extension that has been ratified is the IEEE 802.11g that supports data rates of 54 Mbps but in the original 2.4 GHz ISM band.

The logical link control layer (L2/LLC) is defined by the IEEE 802.3 standard and as a result IEEE 802.11b WLANs are fully compatible with wired Ethernet LANs. In fact the IEEE 802.11b is intended to provide wireless access to a wired Ethernet backbone through access points (APs) and station adapters (STAs).

The Basic Service Set (BSS) is the fundamental building block of the IEEE 802.11 architecture. A BSS is defined as a group of STAs that are under the direct control of a single coordination function. The geographical area covered by the BSS is known as the Basic Service Area (BSA). A BSA is analogous to a "cell" in a cellular communications network.

The IEEE 802.11 standard supports two modes of operation. The first of these is the infrastructure mode that uses a cellular architecture and employs an AP to coordinate the management of the cell and to act as a gateway to a network infrastructure. The other mode of operation is the peer-to-peer or "ad hoc" mode where STAs can communicate directly with one another on a peer-to-peer basis without the use of an AP. This gives rise to what is known as an independent basic service set (IBSS).

The 802.11 standard defines two fundamentally different Medium Access Control (MAC) schemes to transport asynchronous and time-bounded services. The first of these is the distributed coordination function (DCF) used to support asynchronous data transfer on a best effort basis where all STAs must contend with each other to access the medium in order to transmit their data. The DCF allows multiple STAs access the medium without the need for central control and employs a technique known as carrier sense multiple access with collision avoidance (CSMA/CA). The DCF is implemented in the AP and all STAs in both infrastructure and IBSS network configurations. The CSMA/CA mechanism is designed to reduce the collision probability between multiple STAs attempting to access the medium at the same time. To improve reliability all directed (i.e. unicast) traffic uses immediate positive acknowledgment where a re-transmission of the frame is scheduled by the sender if no acknowledgment is received. The present invention is primarily directed at this mechanism. In this context, it will be appreciated that both APs and STAs may be regarded as individual stations since they both contend for access.

The other MAC scheme is the Point Coordination Function (PCF) and is based upon polling. It is designed for the transmission of delay sensitive traffic. The PCF is an optional capability that has not generally been implemented by any of the major manufacturers.

The functionality of the 802.11 standard is reflected in the frame headers. RF technology and STA mobility impose complex requirements on 802.11b WLAN networks. This added complexity is reflected in the PHY and MAC headers.

In order for a network manager to ensure the efficient operation of the network, it is necessary for them to be able to assess the operation of the network. To date there has only been limited capability or a limited number of devices available to assist a network manager in this regard, including WLAN probes.

A variety of WLAN probes are known for assessing the operation of a WLAN. These probes act as wireless listening devices capturing all wireless packets in an area as they are transmitted. As the probes are generally only listening, they are not visible to other WLAN devices.

One use for such WLAN probes is for security, where network administrators employ them to detect and prevent unauthorised network access. Similarly, probes may also be used by hackers to detect accessible networks or networks with security vulnerabilities.

Another use of WLAN probes is to assess the operation of the WLAN. For example, Sniffer Wireless 4.6™ available from Sniffer Technologies Inc., which is a division of Network Associates of Santa Clara, Calif., an administrator can obtain certain basic information about the network performance, including for example how many packets were sent and at what speed, as well as how many data, management, control and encrypted frames have crossed the network in a given time. An administrator may also monitor individual details for individual stations on the WLAN including their transmission speed and signal strength.

The probes can also allow an administrator to analyse the individual packet sizes contained in the frames. Other products such as Airmagnet Reporter™ from Airmagnet Inc. of Sunnyvale, Calif., accept data from a probe and displays a performance value in the form of a percentage figure for WLAN utilization and assists an Administrator to identify WLAN congestion. It is believed, by the inventor of the present invention, that the percentage figure displayed is a mere calculation from the aggregation of the size of data packets received divided by the channel bandwidth (i.e. 11 Mbit/sec). Some probes allow the measurement of network efficiency/load by making attempts to transmit data on the network and measuring the time taken to do so.

A significant disadvantage of the existing probes is that they are generally wireless equivalents of wired packet network analysers, i.e. they analyse the packets transmitted rather than the frames in which they were transmitted. The limited performance values available do not provide sufficient and/or meaningful information about the quality of operation of the WLAN's to provide for sufficient information to truly assist a network manager or to facilitate admission control or quality of service provisioning schemes whereby usage of the network could be restricted as performance on the wireless medium decreases.

SUMMARY OF THE INVENTION

The present invention seeks to address the shortcomings of the prior art by providing methods and apparatus for the calculation of one or more meaningful performance values for a wireless network, which provide information on the performance of the network at the level of MAC layer. These performance values may then, for example, be used to control access to the network or displayed graphically to show a user the performance of the network.

In a first embodiment, a traffic analysis system is providing for obtaining at least one performance value comprises a Medium Access Control (MAC) layer bandwidth for a component on the wireless LAN. The traffic analysis system comprises a receiver for receiving frames transmitted over the wireless LAN, a frame parser for extracting frame information from the received frames, an analyser for analysing the frame information over a predetermined interval to provide the at least one performance value. The at least one performance value which is calculated as the fraction of the predetermined interval is occupied on the wireless LAN by the at least one component.

The at least one MAC layer bandwidth component may comprise one or more of the following:

a) a transmit load bandwidth for an individual station representing the fraction of the predetermined interval occupied by the transmission of the data frames from the individual station on the wireless LAN, b) a reception load bandwidth for an individual station representing the fraction of the predetermined interval occupied by the transmission of the data frames to the individual station on the Wireless LAN, c) an access bandwidth for an individual station representing the fraction of the predetermined interval associated with the contention mechanism for the individual station operating on the wireless LAN, d) a free bandwidth for an individual station representing the fraction of the predetermined interval available to the individual station for transmission of data on the wireless LAN, e) a busy bandwidth representing the fraction of the predetermined interval in which frames were transmitted, and f) an idle bandwidth representing the fraction of the predetermined interval in which frames were not transmitted. The bandwidth may be expressed as a fraction of the line rate.

The traffic analysis system may include a graphical user interface for displaying at least one performance value on a display to a user. The displayed performance value may represent a performance value for the overall WLAN and/or at least one of the individual stations on the WLAN. The displayed performance value may include a combination of one or more of the following:

a) a MAC bandwidth value for the overall LAN, and b) a MAC bandwidth value for at least one of the individual station on the WLAN.

The MAC bandwidths may be stated in text\numerical form on the display and/or graphically represented.

A second embodiment provides a traffic analysis system for a wireless LAN for obtaining at least one performance value for the wireless LAN. The traffic analysis system comprises a receiver for receiving frames transmitted over the wireless LAN, a frame parser for extracting frame information from individual frames received, the frame information including a station identifier for each individual frame and a time stamp, the station identifier identifying the station which transmitted the frame and an analyser for analysing the extracted station identifiers. The performance value is suitably a contention value for an individual station and the analyser is adapted to determine this contention value by counting the number of distinct individual stations identified within a predefined time to live period from receipt of the first frame from the individual station, wherein the predefined time to live period is calculated with respect to inter-frame time durations.

The analyser may be adapted to average a series of contention values obtained for the individual station during a predefined averaging period to provide an average contention value for the individual sender.

The analyser may be further adapted to use the average contention value to determine a figure for the average number of deferrals incurred by the individual station, for example by applying the average contention to a look-up table or algorithm.

The analyser may be further adapted to use the average contention value to determine a figure for the average value of the individual station's backoff counter, for example by applying the average contention value for the station to a look-up table or algorithm.

Suitably, the analyser may be adapted to obtain all contention values for all stations transmitting packets during a predefined period and to average the calculated contention values to determine an average contention value for the wireless LAN. The analyser may be further adapted to determine a probability factor for a collision on the wireless LAN from the determined average contention value for the LAN, for example by applying the determined average contention value to a look-up table or algorithm.

In a third embodiment, a traffic analysis system for providing at least one performance value for a wireless LAN, the traffic analysis system comprising a receiver for receiving packets transmitted over the wireless LAN, a frame parser for extracting frame information from individual frames received, the frame information including a sender identifier for each individual frame and a retry flag identifying whether the individual frame was being retransmitted because of a previous transmission failure, an analyser for identifying types of transmission failure, the analyser being adapted to distinguish between failures arising from transmission errors and collision errors by reference to the degree of correlation between retransmitted frames, wherein said identification is used to provide the performance value.

The at least one performance value may comprise a transmission error value for at least one station representing the number of transmission errors determined for an individual station. The analyser may be adapted to obtain this transmission error value by totalling the number of transmission errors identified for the at least one station within a predetermined period.

The at least one performance value may comprise a collision value for one or more individual stations. In this case, the analyser may be adapted to obtain the collision value by totalling the number of collisions identified for the station within a predetermined period.

The traffic analysis system may include a graphical user interface for displaying at least one performance value on a display to a user. The displayed performance value may represent a performance value for the overall LAN and/or at least one of the individual stations on the LAN.

The invention further provides for a network admission system adapted to control the admittance of stations to a wireless network, in which the admittance of stations to the network is dependent on the at least one performance value determined by the traffic analysis system of one of the above described embodiments.

The invention may further comprise a radio resource management system adapted to adjust individual stations priorities on the network in response to performance values obtained from one of the traffic analysis embodiments of the invention.

The invention also provides for a network admission system for controlling the admittance of stations including a mechanism for removing an active station from the network in response to a performance value determined by the traffic analysis system.

In a fourth embodiment, a method is provided for determining at least one performance value for a wireless LAN. The method comprises the steps of: receiving frames transmitted over the wireless LAN, extracting frame information from the received frames and analysing the frame information over a predetermined interval to determine the at least one performance value comprising a Medium Access Control (MAC) layer bandwidth component. The determination is made by calculating the fraction of the predetermined interval occupied by the at least one component.

The MAC layer bandwidth component may comprise one of the following:

a) a transmit load bandwidth for an individual station representing the fraction of the predetermined interval occupied by the transmission of the data frames from the individual station on the wireless LAN, b) a reception load bandwidth for an individual station representing the fraction of the predetermined interval occupied by the transmission of the data frames to the individual station on the Wireless LAN, c) an access bandwidth for an individual station representing the fraction of the predetermined interval associated with the contention mechanism for the individual station operating on the wireless LAN, d) a free bandwidth for an individual station representing the fraction of the predetermined interval available to the individual station for transmission of data on the wireless LAN, e) a busy bandwidth representing the fraction of the predetermined interval in which frames were transmitted, and f) an idle bandwidth representing the fraction of the predetermined interval in which frames were not transmitted.

The MAC layer bandwidths may be expressed as a fraction of the line rate.

In a fifth embodiment, a method is provided for determining at least one performance value for a wireless LAN comprising the steps of:

receiving packets transmitted over the wireless LAN, extracting frame information from individual packets received, the frame information including a station identifier for each individual frame, the station identifier identifying the station which transmitted the frame, analysing the extracted station identifiers to determine the at least one performance value comprising a contention value for an individual station by counting the number of other stations identified in frames within a predefined time to live period from receipt of the first frame from the individual station.

The method may further comprise the step of averaging a series of contention values obtained for the individual station during a predefined period to provide an average contention value for the individual sender. The average contention value may be used in a subsequent step to determine a value for the average number of deferrals incurred by the individual station, for example by applying the average contention to a look-up table or algorithm.

The average contention value may also be used to determine a figure for the average value of an individual station's backoff counter, for example by applying the average contention value for the station to a look-up table or algorithm.

The method may comprise the further step of averaging all contention values determined during a predefined period to calculate an average contention value for the wireless LAN. The method may comprise the further step of determining a probability factor for a collision on the wireless LAN from the determined average contention value for the LAN, for example by applying said average contention value to a look-up table or algorithm.

In a sixth embodiment, a method is provided for determining at least one performance value for a wireless LAN. The method comprises the steps of:

receiving packets transmitted over the wireless LAN, extracting frame information from individual frames received, the frame information including a sender identifier for each individual frame and a retry flag identifying whether the individual frame was being retransmitted because of a previous transmission failure, identifying types of transmission failure by distinguishing between failures arising from transmission errors and collision errors by reference to the degree of correlation between retransmitted frames, and using the identification to provide the performance value.

The at least one performance value may comprise a transmission error value for at least one station and the method comprises the further step of totalling the number of transmission errors identified for the at least one station within a predetermined period to provide said transmission error value for the station.

The at least one performance value may comprise a collision value for at least one station, in which case the method comprises the further step of totalling the number of collisions identified for the station within a predetermined period to provide the collision value for the station.

The fourth, fifth and sixth embodiments described above may each comprise the additional step of displaying at least one performance value to a user. The at least one performance value displayed may be for at least one individual station and/or the overall LAN.

In the case of the fourth embodiment, the at least one performance value comprises a MAC bandwidth value for the overall LAN and/or an individual station, which may be displayed as a graphical representation.

The invention also provides a method for controlling the admittance of stations to a wireless network, wherein admittance is determined by reference to the at least one performance value determined by any one of the methods described above. The invention may also provide for the removal of an active station from the network in response to the determination of a performance value by one of the methods described above.

The invention may further comprise a method of managing radio resources comprising the adjustment of individual stations priorities on a network in response to performance values obtained from one of the traffic analysis methods of the invention.

Other embodiments, features and advantages of the invention will become apparent from the detailed description of the invention which follows.

BRIEF DESCRIPTION OF THE DRAWINGS

The present invention will now be described with reference to the accompanying drawings in which.

DETAILED DESCRIPTION OF THE DRAWINGS

Description of the Preferred Embodiments

In contrast to the prior art which analyses individual data packets as if they had been transmitted over a conventional wired network, the inventor of the present invention has realised that an important aspect for meaningful analysis is to consider the transmission of frames on the wireless medium and in particular to consider the operation of frames at the second (MAC) layer and the effect of the CSMA/CA techniques on the transmission of data.

In particular, the inventor has realised that it would be advantageous to analyse the times occupied by stations in transmitting frames on the medium rather than as described in the prior art probes by measuring the actual data throughput in packets. The invention also seeks to investigate apparently idle time on the network rather than to focus (as done by the prior art) on packets successfully received and extracted from the transmitted frames.

Figures 1, 2:
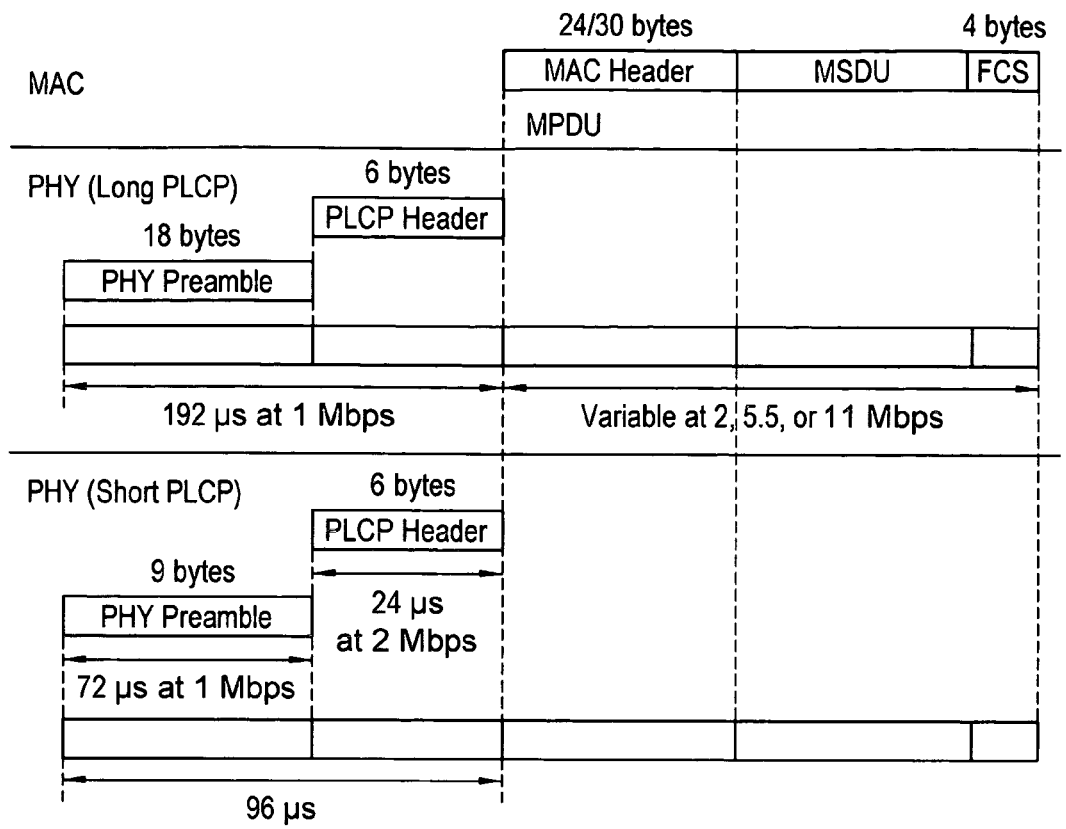
FIG. 1 is a graphical representation of the structure of frames in accordance with the IEEE 802.11b Wireless standard.
FIG. 2 is a graphical representation of the structure of MAC Frames in accordance with the IEEE 802.11 Wireless standard.

To this end, the inventor has conducted a detailed analysis of the 802.11 frame structure and transmission characteristics, which will now be described in greater detail. A typical 802.11 wireless frame, as illustrated in FIG. 1, comprises higher-level protocol data (known as a MAC Service Data Unit or MSDU for short) inside a physical layer header, followed by a MAC layer header with an associated Frame Check Sum (FCS) trailer for error control.

The physical layer header is called the PLCP (Physical Layer Convergence Protocol) and consists of the PLCP preamble and the PLCP header. The PLCP header is used by the network hardware to control the transmission and maintain the physical link between the STAs, e.g. it contains information on the transmission rate being used for the WLAN.

There are two forms of PLCP preamble: the longer form which is included for backward compatibility, and the more commonly used short form. Because the PLCP header contains the information on the transmission rate, the PLCP preamble of every frame is transmitted at the lowest transmission rate, i.e. 1 Mbps. The long form preamble maintains this rate for the whole duration of the PLCP, while the short form preamble permits the PLCP header portion to be transmitted at 2 Mbps reducing the time required for its transmission. The respective durations of the two PLCP preamble forms are calculated by multiplying their length in bits by the line rate and are as follows:

$$T_{PLCP}(\text{long}) = 192 \ \mu s \tag{1}$$

$$T_{PLCP}(\text{short}) = 96 \ \mu s \tag{2}$$

The particular format of the 802.11 MAC header depends on the type of frame being transmitted. Exemplary frame structures are illustrated in FIG. 2. There are three main types of 802.11 frame used: data frames, control frames, and management frames.

Data frames are primarily responsible for the transport of the higher-level protocol data packets (i.e. MSDUs) from one STA to another STA. The generic data/management frame contains four MAC address fields as well as other fields giving additional information on the frame, e.g. a retry flag that indicates that the frame is a re-transmission attempt. The standard data/management frame header has a length of 34 bytes including the 4-byte FCS field. The fourth address field is intended for bridging and is optional. In practice the data frame header is 28 bytes long and has a duration $T_{DATA}$ given by:

$$T_{DATA} = T_{PLCP} + 8 \times (28 + \text{MSDU})/\text{Line\_Rate} \tag{3}$$

where MSDU is the size of the data payload in bytes and Line_Rate is the PHY transmission rate. The actual line rate used depends on signal power, distance, and interference, among other factors. To accommodate these variables, the 802.11 protocol permits negotiation of transmission rates for each session.

For example, in an 802.11b WLAN operating at 11 Mbps and using the short form of the PLCP preamble, the duration of a data frame containing a 512 byte MSDU payload is $$T_{DATA} = 96 + 8 \times (28 + 512)/11$$

$$= 96 + 392.73$$

$$= 488.73 \ \mu s$$

Control frames assist in the delivery of data frames. They administer access to the wireless medium and provide MAC-layer reliability functions, e.g. the positive acknowledgment mechanism. Control and data frames work in conjunction to transport data reliably between STAs. Control frames are short frames that directly mediate or control communications and include the Request-To-Send (RTS), Clear-To-Send (CTS), and Acknowledgment (ACK) frames, as well as Power Save (PS) polling frames.

The ACK control frame contains 14 bytes, and the duration of this particular frame is $$T_{ACK} = T_{PLCP} + (8 \times 14)/\text{Line\_Rate} \quad (4)$$

For example, in an 802.11b WLAN operating at 11 Mbps and using the short form of the PLCP preamble, the duration of the ACK control frame is $$T_{ACK} = 96 + (8 \times 14)/11$$
$$= 96 + 10.18$$
$$= 106.18 \ \mu s$$

Management is a large component of the 802.11 standard. Several different types of management frame are specified in order to provide the type of management functionality that is found on a wired network. Management frames perform supervisory functions, e.g. they are used to support STA authentication, association, and synchronization. Their formats are similar to those of data frames but with fewer fields in the MAC header. In addition management frames may have data fields of fixed or variable length.

One of the more important management frames is the Beacon frame that announces the existence of an 802.11 network and is vital for many network maintenance tasks. They are transmitted at regular intervals to allow STAs to find and identify a network. In the infrastructure mode, Beacon frames are transmitted by the AP. The Beacon frame contains a great deal of detailed information about the BSS, namely its name (known as its BSSID) as well as capability information pertaining to supported bit rates and preamble type used.

Frames that are destined for a single STA are generally called directed or unicast frames and to improve reliability these must be positively acknowledged. If the sender does not receive an ACK control frame, the unicast data frame is assumed to have been lost and the sender will attempt to retransmit the frame. Broadcast and multicast frames have the simplest frame exchanges because there is no acknowledgment required.

The basic medium access protocol in 802.11 WLANs is the DCF that allows for automatic medium sharing between compatible PHYs through the use of CSMA/CA. CSMA/CA is a "listen-before-talk" access protocol where STAs wishing to transmit a data frame have to "listen" to the medium for some predefined amount of time to ensure that it is free (or idle) before initiating transmission. Carrier sensing is used to determine if the medium is idle. Two types of carrier sensing functions are specified in the 802.11 standard to manage this process: Physical carrier sensing which is performed at the Physical (PHY) layer and virtual carrier sensing which is provided by the Network Allocation Vector (NAV). Most 802.11 frames carry a duration field that can be used to reserve the medium for a fixed time period. The NAV is a timer that indicates the amount of time for the medium needs to be reserved.

Priority access to the medium may be controlled through the use of Inter Frame Space (IFS) time intervals between the frame transmissions. The IFS intervals are mandatory periods of idle time on the medium. The 802.11 standard defines four different IFS intervals, three of which are used to determine medium access. These four IFS intervals are as follows:

Short Inter Frame Space (SIFS)
PCF Inter Frame Space (PIFS)
DCF Inter Frame Space (DIFS)
Extended Inter Frame Space (EIFS)

To ensure interoperability between different data rates, the inter frame space is a fixed amount of time, independent of transmission speed. Different physical layers, however, can specify different inter frame spaces.

The Short IFS (SIFS) is used for the highest priority transmissions (i.e. control frames), such as ACK and RTS/CTS frames. High priority transmission can begin once the SIFS has elapsed. In 802.11b, SIFS has been defined as:

$$\text{SIFS} = 10 \ \mu s \quad (5)$$

The PCF IFS (PIFS) is used by the PCF during contention-free operation. STAs with data to transmit in the contention-free period can transmit after PIFS has elapsed and pre-empt any contention-based traffic. In 802.11b, PIFS has been defined as:

$$\text{PIFS} = 30 \ \mu s \quad (6)$$

However, the PCF is an optional capability that has never generally been implemented.

The DCF IFS (DIFS) is the minimum idle time for contention-based (i.e. DCF) services and is used for the transmission of data and management frames. In 802.11b, DIFS has been defined as:

$$\text{DIFS} = 50 \ \mu s \quad (7)$$

The Extended IFS (EIFS) is used to recover from a failed transmission attempt. The EIFS is used by the DCF whenever the PHY has indicated to the MAC that a transmission was begun that did not result in the correct reception of a complete MAC frame with a correct FCS value. The duration of EIFS is defined so as to provide enough time for another STA to acknowledge the incorrectly received frame. It is derived from the SIFS, DIFS, and the time required to transmit an ACK frame at the basic rate of 1 Mbps, i.e.

$$\text{EIFS} = \text{SIFS} + T_{ACK}(@1 \text{ Mbps}) + \text{DIFS} \quad (8)$$

For example, in an 802.11b WLAN operating at 11 Mbps and using the short form of the PLCP preamble, the duration of the EIFS is $$EIFS = 10 + T_{PLCP} + (8 \times 14)/1.0 + 50$$
$$= 10 + 96 + 112 + 50$$
$$= 268 \ \mu s$$

Figure 3:
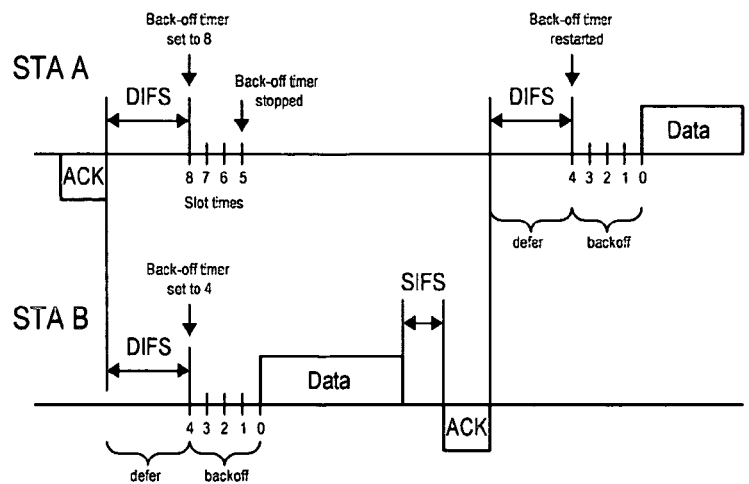
FIG. 3 is a graphical representation of the Basic Access Mechanism in accordance with the IEEE 802.11 Wireless standard.

Any STA wishing to transmit a data or management frame first invokes the carrier sense mechanism to determine the busy/idle state of the medium. If the medium is busy, the STA defers its transmission, as shown in FIG. 3 where STA A defers to STA B, until the medium is determined to be idle without interruption for a period of time equal to DIFS when the last frame detected on the medium was received correctly or for a period of time equal to EIFS when the last frame detected on the medium was not correctly received. As part of the collision avoidance mechanism, the 802.11 MAC requires STAs to delay their transmission for an additional random Backoff interval after the medium becomes idle. The Backoff interval is used to initialise a Backoff Timer. The Backoff Timer is decreased as long at the medium remains idle, stopped when the medium is sensed busy, and reactivated when the medium is sensed idle again for longer than DIFS (or EIFS as appropriate). A STA may transmit its frame when its Backoff Timer reaches zero. The backoff time is slotted and a STA is only allowed to transmit at the beginning of a time slot. For example, the duration of the time slot in 802.11b has been defined as:

$$\text{Slot\_Time} = 20 \, \mu s \quad (9)$$

The Backoff interval is randomly generated using the following:

$$\text{Backoff interval} = BC \times \text{Slot\_Time} \quad (10)$$

where BC=pseudorandom integer drawn from a uniform distribution over the interval [0,CW] where CW is an integer referred to as the contention window, i.e. the Backoff Counter value.

The effect of this procedure is that when multiple STAs are deferring and go into random backoff then the STA selecting the smallest backoff time will win the contention. The use of this process has the advantage it promotes fairness among the STAs as each STA must recontend for access after every transmission.

Occasionally, two or more STAs may choose the same BC value, which will subsequently lead to a collision whereby the STAs involved will attempt to transmit their frames at the same time. In order to resolve collisions between STAs, an exponential Backoff scheme is adopted. At the first transmission attempt, the contention window (CW) is set to $CW_{min}$ (i.e. the minimum contention window). After each unsuccessful transmission CW is doubled up to a maximum value of $CW_{max}$. By increasing the size of the CW, it reduces the probability of two STAs selecting the same BC value. In the 802.11b standard, $CW_{min}=31$ and $CW_{max}=1023$.

It will be appreciated that the access mechanism employed by the 802.11 MAC is inherently stochastic both from the point of view of the randomly selected Backoff Interval but also from the number of times a STA may have to defer to another STA. Although this feature is primarily intended to minimize the probability of collision, it can result in significant transmission delays being introduced into the delivery of a data packet. Large delays can have an adverse effect of time sensitive traffic such as Voice over IP (VoIP) or video streaming. Consequently, the DCF based access mechanism is primarily suitable for a best effort service. Although, there are methods for prioritising traffic in for example IEEE 802.11e which includes a quality of service enabling enhancement over the IEEE 802.11b standard. The present invention provides a method/system which may be used to take a series of resource usage measurements, which in turn may be fed into a control algorithm that in turn adjusts the 802.11e parameters to optimise the response of the WLAN to the offered traffic.

The origin of the 802.11 WLAN traffic probe of the present invention lies in a particularly useful descriptive framework developed by the inventor for identifying network resource usage on WLANs that is based around individual station performance values and the concept of MAC bandwidth components. In particular, the inventor has identified three MAC bandwidth components for individual stations: a load bandwidth (BWload) that is associated with the transmission of the data frames, an access bandwidth (BWaccess) associated with the contention mechanism (whereby a station wins access to the wireless medium) and a free bandwidth (BWfree) that is associated with the quality of service. This framework results in an intuitive and compact description of MAC resource usage that is particularly suited to admission control and quality of service provisioning schemes. The MAC bandwidths represent the fraction of time occupied of the transmission medium as fraction of the line rate. The inventor has also identified two medium related MAC bandwidths $BW_{busy}$ and $BW_{idle}$ associated with times when there is a station transmitting on the network and times when there are no stations transmitting on the network.

Figure 4:
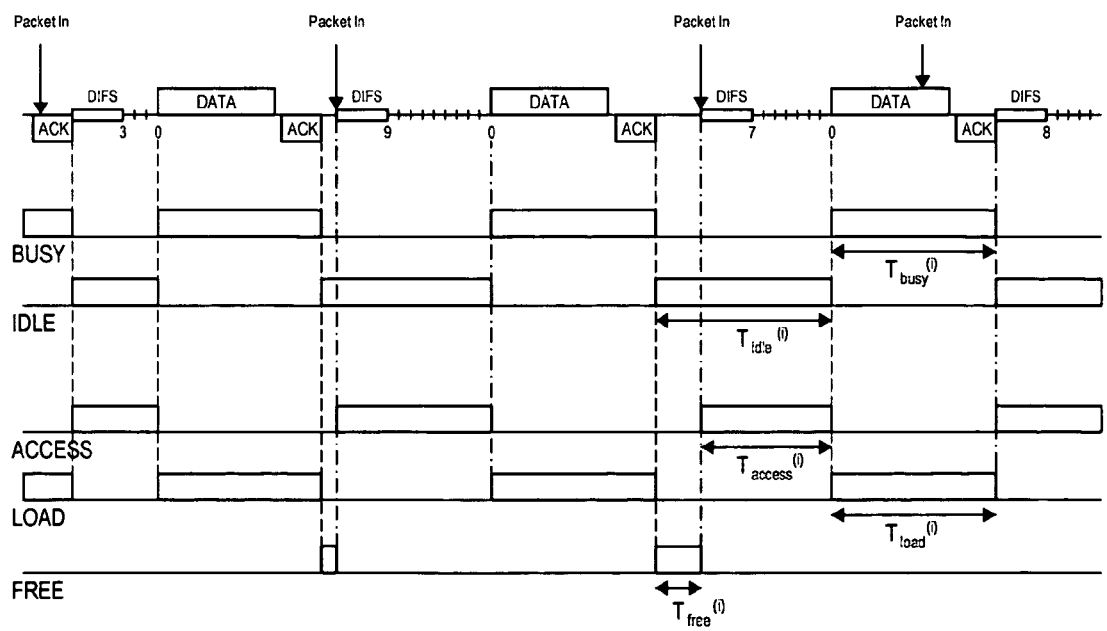
FIG. 4 is a graphical representation of the various time intervals involved in accessing the wireless medium under a CSMA/CA scheme.
Figure 5:
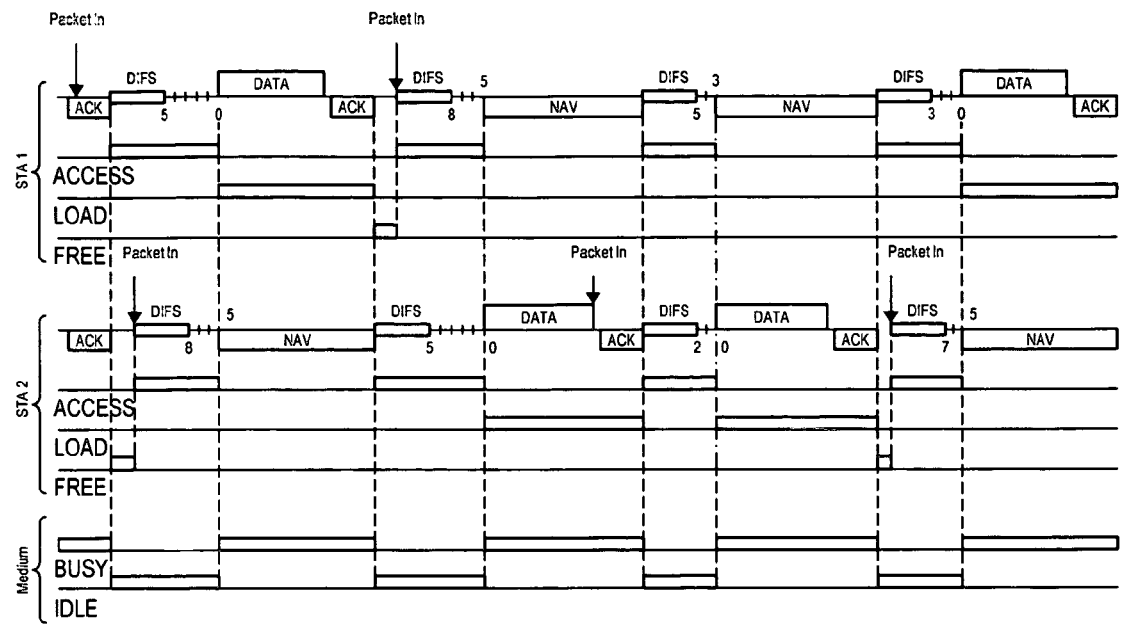
FIG. 5 is a graphical representation of the time intervals involved in the exemplary situation when two STAs are competing for access under a CSMA/CA scheme.

From the description of the basic access mechanism above, a number of different critical time intervals have been identified on the wireless medium, as illustrated by the exemplary transmission sequences of a single station transmitting FIG. 4 and two stations competing to transmit in FIG. 5. Firstly, there are the intervals during which the medium is busy corresponding to the transmission of frames and their positive acknowledgment (at least in the case of data and management frames). This busy time on the medium is associated with the transport of the traffic load.

The complementary time intervals are the idle intervals. An individual STA can make use of these idle intervals in a number of ways. If the STA has a data or management frame awaiting transmission, it uses the idle time on the medium to allow DIFS (or EIFS as appropriate) and Slot-Time intervals to elapse. This portion of the medium idle time corresponds to the time spent by the individual STA in contending for access to the medium.

If an individual STA does not have a frame to transmit, the idle time is not being used and may be therefore considered to be free in the sense that the medium is available, if required, by the particular STA. This free time on the medium can be viewed as spare capacity on the medium, essentially acting as a reservoir that can be drawn on when required. The amount of free time experienced by an individual STA is closely related to the level of quality of service experienced by its traffic load where the greater the free capacity available to a STA, the better the quality of service likely to be experienced by that STA. It will be appreciated that different stations will have different free time since they will not always be attempting to gain access to the medium at the same time.

It will further be appreciated that instantaneous values of busy and idle time intervals are somewhat meaningless. Accordingly, the busy and idle time intervals may be summed (over some measurement interval of interest, for example one second) as follows to provide a more meaningful figure:

$$T_{busy} = \sum_i T_{busy}^{(i)} \quad (11)$$

$$T_{idle} = \sum_i T_{idle}^{(i)} \quad (12)$$

where $T_{busy}^{(i)}$ and $T_{idle}^{(i)}$ are the durations of the $I^{th}$ busy and idle intervals respectively within the measurement interval of interest. $T_{busy}^{(i)}$ may be calculated directly from the details of the transmitted frame using either equations (3) or (4) described above.

Although, these figures are useful, network managers are more familiar conceptually with bandwidth. Accordingly, a more useful and meaningful description of these quantities is to first normalize the $T_{busy}$ and $T_{idle}$. These normalised values may then be converted into a bandwidth related to the transmission line rate by multiplying the line rate as follows:

$$BW_{busy} = \frac{T_{busy}}{T_{busy} + T_{idle}} \times \text{Line\_Rate} \quad (13)$$

$$BW_{idle} = \frac{T_{idle}}{T_{busy} + T_{idle}} \times \text{Line\_Rate} \quad (14)$$

where obviously, $$BW_{busy} + BW_{idle} = \text{Line\_Rate} \quad (15)$$

and where $BW_{busy}$ represents the portion of the line rate bandwidth used for the transport of the total traffic load. Similarly, $BW_{idle}$ represents the portion of the line rate bandwidth that is idle and may be used by a STA to win access opportunities for its load.

By examining the address fields contained in the MAC header, it is possible to identify the sender and recipient of a frame, i.e. the station transmitting the frame and the intended station for receiving the frame. Using the address fields permits the association of individual transmitted frames with individual STAs (i.e. the sender of the packet). This association leads to the concept of calculating a load bandwidth $BW_{load}(k)$ for an individual STA k. This load bandwidth corresponds to that portion of the line rate bandwidth used by a particular STA k in transporting its traffic load. The load bandwidth is directly related to the throughput of the individual STA.

The busy time on the medium used by STA k in transmitting its load is $$T_{load}(k) = \sum_i T_{load}^{(i)}(k) \quad (16)$$

Similarly as described above, this figure may be converted to a line rate bandwidth (load bandwidth) using the following:

$$BW_{load}(k) = \frac{T_{load}(k)}{T_{busy} + T_{idle}} \times \text{Line\_Rate} \quad (17)$$

Although, Equation 17 is expressed as a factor multiplied by the line rate, it will be appreciated by those skilled in the art this multiplication is merely the application of a scaling factor. Thus, for the purposes of further analysis (automated or otherwise) or graphical display to a user (for example as a bar graph), a simpler figure of bandwidth without the application of the line_rate scaling factor may be adopted. It will be appreciated that although the application of the scaling factor is an optional feature that it offers certain advantages in that it provides the user an intuitive feel for the sizes of the bandwidth components.

In the single-station case, it will be appreciated that $BW_{busy}$ and $BW_{load}$ should be identical. However, in the multiple station case, the situation is different because of collisions with other STAs.

$$BW_{busy} = \sum_k BW_{load}(k) - BW_{collisions} \quad (18)$$

Inevitably, some bandwidth may be lost due to collisions between multiple STAs attempting to transmit at the same time. Accordingly, it may be necessary to account for collisions in any calculation of the $BW_{busy}$.

It will be appreciated that that apart from times during collisions, individual STAs do not share the line rate bandwidth during their transmissions. In other words, once a STA has won access to the medium, it has exclusive use of the medium for the duration of its transmission. This is to be viewed in contrast to the idle bandwidth which is shared by all STAs in the sense that any individual STA may make use of the idle time intervals on the medium to allow periods of DIFS or Slot_Time to elapse. Furthermore, each STA may be viewed as perceiving the idle bandwidth as comprising two components; an access bandwidth $BW_{access}$ used to contend for access opportunities and a free bandwidth $BW_{free}$ corresponding to the remaining unused idle bandwidth, i.e. for any individual STA k the following would apply:

$$BW_{access}(k) + BW_{free}(k) = BW_{idle} \quad (19)$$

or $$BW_{busy} + BW_{access}(k) + BW_{free}(k) = \text{Line\_Rate} \quad (20)$$

If the access and free intervals during the idle periods may be identified and measured on a per-STA basis, then the corresponding access and free bandwidths for a given STA k may be obtained as follows:

$$BW_{access}(k) = \frac{T_{access}(k)}{T_{busy} + T_{idle}} \times \text{Line\_Rate} \quad (21)$$

$$BW_{free}(k) = \frac{T_{free}(k)}{T_{busy} + T_{idle}} \times \text{Line\_Rate}$$

where $$T_{access}(k) = \sum_i T_{access}^{(i)}(k) \quad (22)$$

$$T_{free}(k) = \sum_i T_{free}^{(i)}(k)$$

Figure 6:
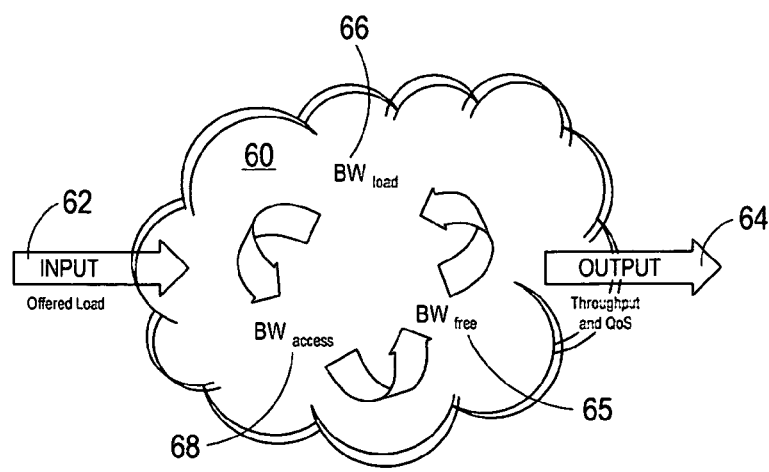
FIG. 6 is a graphical representation of the MAC bandwidth components concept employed by the present invention.

The present invention includes a descriptive framework for WLAN resource usage defining three MAC bandwidth components $BW_{load}$ 66, $BW_{access}$ 68, $BW_{free}$ 65 that are tightly coupled, as illustrated in FIG. 6, via equations (11) to (22) to define how data input 62 is actually outputted 64 from the wireless medium 60. This framework provides an intuitive and compact description of the operation of the 802.11 MAC mechanism that may be provided to a network manager in a graphical display. It is also ideally suited to supporting admission control and quality of service provisioning schemes on 802.11 WLANs.

Figure 7:
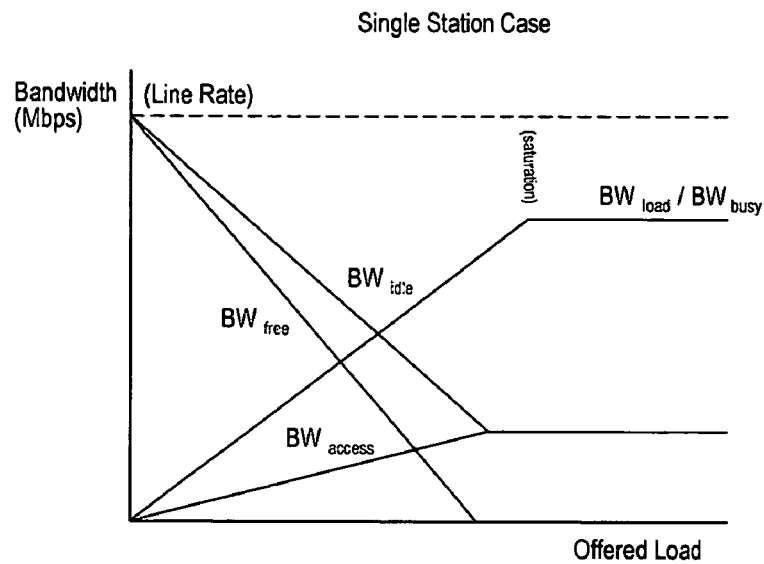
FIG. 7 is a graphical representation of performance characterization using MAC bandwidth components.

For example, it may be used to give an advanced warning to a network manager (or a traffic provisioning quality of service scheme) of the on-set of saturation. Consider, for example as illustrated in FIG. 7, the case of a single STA where the offered traffic load is linearly increasing. As the load increases, the load bandwidth ($BW_{load}$) also increases as more and more wireless frames are transmitted. Similarly, $BW_{access}$ must also increase as more transmission opportunities need to be obtained in order to support $BW_{load}$. As $BW_{load}$ increases, $BW_{busy}$ increases and $BW_{idle}$ decreases.

The effect of an increasing $BW_{access}$ and a decreasing $BW_{idle}$ causes $BW_{free}$ to decrease until a point is reached where $BW_{free}$ has been reduced to zero or where there is just a sufficient amount of idle time on the medium to support the access requirements for the transmitted load. Increasing the offered load beyond this point does not result in any further increase in either $BW_{load}$ or $BW_{access}$ as saturation has been reached. Severe packet loss results at this point. The amount of free bandwidth ($BW_{free}$) may serve as an indication of the level of quality of service likely to be experienced by a STA.

The on-set of STA saturation occurs when $BW_{free}(k)$ has been reduced to zero, i.e.

$$\left. \begin{array}{l} BW_{free}(k) = 0 \\ \text{or } BW_{access}(k) = BW_{idle} \end{array} \right\} \text{ under saturation}$$

In other words, all of the idle bandwidth is being used by the STA in accessing the medium in order to support its load. There is no additional capacity remaining to support an increased load, i.e. the STA is saturated and cannot support any more traffic.

This descriptive framework of WLAN resource usage based upon MAC bandwidth components (i.e. $BW_{access}$, $BW_{load}$, and $BW_{free}$) forms the basis of one aspect of the WLAN traffic probe of the present invention. Consequently, techniques for obtaining these bandwidth components from a series of measurements performed on the observed WLAN traffic will now be discussed.

One of the guiding principles behind the development of the WLAN traffic probe of the present invention is that the probe should be possible to obtain (or at least infer) all of the various traffic metrics (performance values) by passively "sniffing" the wireless frames on the medium.

At the heart of the probe (described below in greater detail) of the present invention is a WLAN device, for example a 802.11b WLAN card operating in a promiscuous mode. In a promiscuous mode, WLAN cards are configured to only receive traffic (i.e. not to transmit packets). Nevertheless, in the promiscuous mode the WLAN card is capable of receiving all frames on a medium including those frames not intended for it. This process of receiving all frames on a medium is sometimes referred to as "sniffing" the medium. Each individual frame received is captured in their entirety. By parsing the PCLP and MAC headers of the individual frames it is possible to obtain information including the one or more of the following frame metrics:

Time stamp (i.e. the time of capture)
Transmission rate (i.e. the line rate)
PLCP preamble (i.e. the short or long form)
Frame type (i.e. data, control or management)
Frame size (i.e. MSDU size in bytes)
Sender of the frame
Intended recipient(s) of the frame
Frame is a re-transmission attempt or not The present invention includes an analyser for analysing the frame metrics information over a predetermined interval. This analysis is performed in order to calculate a performance value representing one of the hereinbefore described Medium Access Control (MAC) layer bandwidth components. This analysis calculates the fraction of the predetermined interval occupied by the at least one component (e.g. load, idle, free, access, busy).

From these measurements (frame metrics), it is possible to directly obtain a figure for two of the MAC bandwidths, i.e. $BW_{busy}$ and $BW_{idle}$. The basis of the technique is to identify and measure the busy time intervals $T_{busy}^{(i)}$ on the medium. $T_{busy}^{(i)}$ intervals are essentially the duration of the $i^{th}$ captured frame and may be obtained using equation (3) or (4) and a knowledge of the frame size, transmission rate, and type of preamble used. By summing $T_{busy}^{(i)}$ over all of the frames captured within the measurement interval of interest, $T_{busy}$ (may be obtained, see equation (11)). This in turn allows $BW_{busy}$ to be calculated using equation (13). Once $BW_{busy}$ has been calculated, $BW_{idle}$ may then be obtained using equation (15). Alternatively, $T_{idle}$ may be calculated by subtraction of $T_{busy}$ from the measured interval.

Individual STA load bandwidth $BW_{load}(k)$ may be obtained directly from the medium by first filtering the captured frames by their sender address and then employing the same procedure as described above for $BW_{busy}$ (except on a per station basis). Another figure for individual STA load bandwidth $BW_{load}(k)$ may be obtained directly from the medium representing the bandwidth load consumed by stations having data transmitted to them by first filtering the captured frames by their recipient (destination) address and then employing the same procedure as described above for $BW_{busy}$ (except on a per station basis).

However, the other two STA bandwidth components, i.e. $BW_{access}(k)$ and $BW_{free}(k)$, may not be obtained directly from the medium (received frames). The reason for this, is that it is not possible to distinguish between the access times (deferral, backoff) and free intervals on the wireless medium. Because these intervals occur during the idle times on the medium, there is no indication given as to what phase each of the STAs are currently undergoing. The only phase of STA operation that is directly observable is the transmission phase. As explained above, this may be used to obtain the $BW_{busy}$ and $BW_{load}(k)$ components.

From equation (19), it may be seen, that if you obtain either the Access Bandwidth or the Free Bandwidth, the other may be obtained. The inventor has realized that $BW_{access}(k)$ may be obtained by indirectly inferring its value from a measure of the average contention experienced by the STA k.

Depending on the particular traffic conditions prevailing at any given time on a WLAN, a STA may experience several cycles of deferral (i.e. waiting DIFS or EIFS) and backoff (i.e. decreasing its Backoff Timer) before being allowed to transmit its frame. The actual number of times a STA has to defer will depend on a large number of factors, including, for example, the number of STAs currently contending for access, its own initial Backoff Interval, as well as the Backoff Intervals of other contending STAs.

The access time for an individual station may be viewed as having two distinct parts; the time spent deferring and the time spent backing off. However, both of these time intervals are essentially random. Accordingly, the present invention considers the average time spent in deferring $\overline{T}_{defer}$ and the average time spent in backing off $\overline{T}_{backoff}$. In other words, the average idle time on the medium needed by a STA in order to access the medium may be defined as:

$$\overline{T}_{access} = \overline{T}_{defer} + \overline{T}_{backoff} \tag{23}$$

where $$\overline{T}_{defer} = \overline{\#}_{defers} \times \overline{T}_{IFS} \tag{24}$$

and $$\overline{T}_{backoff} = \overline{BC} \times \text{Slot\_Time} \tag{25}$$

where $\overline{\#}_{defers}$ is the average number of times that a STA has to defer to a busy medium condition, $\overline{T}_{IFS}$ is the average duration of the deferral interval, and $\overline{BC}$ is the average initial BC value.

In the case of a single STA where there is no contention for access $\overline{\#}_{defers}=1$. Since there is no contention there will be no collisions and therefore $\overline{T}_{IFS}$=DIFS. Similarly, the BC values may be taken as being uniformly distributed between 0 and $CW_{min}$ only (see the previous discussion on contention window size) and therefore calculated as the average there between, i.e. $\overline{BC}=CW_{min}/2$.

However, in the multiple STA case, it is likely that there will be contention for access which means that $\overline{\#}_{defers}$ may be greater than one. Moreover, since there is now the possibility of collisions occurring $\overline{T}_{IFS}$ may be greater than DIFS and $\overline{BC}$ may be greater than $CW_{min}/2$ (mechanism discussed above).

If $\rho$ is defined as the probability that a frame fails to be positively acknowledged, i.e. the probability that a mandatory idle interval of EIFS will follow the transmission of the frame, then $\overline{T}_{IFS}$ may be defined as $$\overline{T}_{IFS}=(1-\rho)\times DIFS+\rho\times EIFS \qquad (26)$$

In order to obtain an estimate for $\overline{T}_{access}$ it is necessary to measure, or at least infer, at least one of and preferably all of the following:

The average number of deferrals $\overline{\#}_{defers}$
The average initial BC value $\overline{BC}$
The probability of a failed transmission $\rho$ Finally, the total access time ($T_{access}$) may be obtained by multiplying the individual access time for a frame ($\overline{T}_{access}$) by the total number of frames (frame_cnt) transmitted within the measurement interval of interest:

$$T_{access}=\overline{T}_{access}\times frame\_cnt \qquad (27)$$

Obtaining $T_{access}$ allows $BW_{access}$ and hence $BW_{free}$ to be calculated using (21) and (19).

For the same reasons outlined earlier, it is not possible to measure the parameters $\overline{\#}_{defers}$, $\rho$ and $\overline{BC}$ directly from the medium. Instead, an alternative method has been adopted in order to obtain this STA-specific MAC information. This method is based on indirectly inferring their values from a series of passive observations performed on the traffic. Specifically, the method is based upon determining the average contention experienced by a STA which is related to how much competition a STA experiences in contending for access. Once the average contention has been determined for a station, estimates of the average backoff counter value and the average number of deferrals may be obtained.

The average contention (which in itself may be viewed as a performance value) may be defined as the average number of STAs contending for access over the duration of the measurement interval of interest. It will be appreciated that depending on their particular load, different STAs will experience different levels of contention. The average contention reflects the average number of deferrals a STA will experience. Similarly, the average contention reflects the probability of a collision where the greater the contention the greater the number of deferrals and the higher the probability of a collision. Furthermore, the higher the probability of collision, the larger the initial BC value owing to the exponential backoff mechanism whereby the contention window is doubled after a failed transmission (described above in the background discussion of the IEEE 802.11 specification).

Therefore, the average contention may be viewed as an important performance value that indicates the level of WLAN resource usage. In the method of the present value, the average contention may also be used to determine the average number of deferrals $\overline{\#}_{defers}$ and the probability of collision $\rho$. The probability of collision in turn may be used to determine an average initial BC value $\overline{BC}$.

Rather than make a determination each time, which would require a computationally expensive process, the preferred method of the present invention is to compute values for these parameters ($\overline{\#}_{defers}$, $\rho$, $\overline{BC}$) offline (using computer simulation) as a function of the average station contention. A "look up table" approach, appropriate interpolation, or by applying a function (previously determined by a suitable curve fitting technique) may then be used to obtain the values of these parameters from measured values of the average station contention. It will be appreciated that in the case of the computer simulation, the calculation of the values for these parameters is a function of integer values of average contention, i.e. the calculation is performed under saturation conditions where the average contention (or equivalently the average station contention) is given by the number of stations.

By estimating the average contention experienced by each STA, it is possible to infer the values of $\overline{\#}_{defers}$, $\rho$ and $\overline{BC}$ on a per-STA basis. These parameters allow $\overline{T}_{access}$ to be calculated which in turn allows $BW_{access}$ and hence $BW_{free}$ to be obtained.

A requirement here is the ability to measure (estimate) the average contention on a per-STA basis from a series of passive traffic observations on the wireless medium.

Each transmission attempt (which may or may not result in a successful transmission) is the result of a single contention period comprising a single cycle of a deferral phase followed by a backoff phase. Although a STA may require several contention phases in order to gain access to the medium, each transmission attempt, irrespective of the particular STA involved, is the result of a successful outcome (i.e. where the backoff timer reaches zero) from a single contention period in which one or more STAs are competing. The average contention is the number of rival STAs contending for each transmission attempt averaged over all transmission attempts or more simply the average number of STAs contending for each transmission attempt.

The inventor of the present invention has realized that STA transmission attempts that originate from the same contention period will be closely correlated in time. Thus, they will appear on the wireless medium within a time interval corresponding to the duration of the contention window of each other. Consequently, all the rival STAs competing against each other during a contention period should appear on the wireless medium, clustered together with inter-frame times of the order of the duration of the contention window.

One method proposed by the inventor for calculating contention comprises counting the number of frames transmitted by individual stations during a sampling interval as a fraction of the frames transmitted overall and to average these figures out over a longer time period. The results of this method are however extremely crude. One reason for this is that contention never exists when a station successfully transmits a frame. It will be appreciated that the actual time to transmit any individual frame will depend on the quantity of data contained within the frame and thus there will be an inherent error if a fixed sampling period. A second reason for the crudeness of the results is that the number of frames transmitted by stations is not a true reflection of contention, since a station may transmit five frames at the beginning of a sampling interval and another station may transmit a similar number of frames at the end of a sampling period, in which case the actual contention value will differ significantly from the measured value using the above method. Nonetheless, the method may have application in particular scenarios where its inaccuracies may be tolerated.

Accordingly, the inventor has developed an improved algorithm for measuring the average contention which exploit the temporal correlation of the inter-frame times and involves identifying and counting the contending STAs involved in each contention period. The average contention may then be obtained by averaging the contending STA count over all contention periods within a given period of time.

As discussed, the present invention includes a method for measuring average contention. This method is based upon identifying and counting the STAs involved in a contention period. The temporal correlation of the inter-frames times may be used by the analyser to identify the particular STAs involved. Suitably, the contention period is based on the inter-frame times, i.e. does not include period where frames are actually being transmitted.

Obtaining the average contention is based upon calculating the average length that a chain or linked list of the sender addresses of the captured frames. The contention at any one instant may be viewed as being defined by one of these chains. The analyser determines a contention value for an individual station by counting the number of stations identified in a chain. Each chain begins with the receipt of a first frame from an individual station and ends after predefined time to live period from receipt of the first frame from the individual station in the chain. As each new frame is received a new chain is started. Similarly, the time to live period for each of the individual chains is updated with the inter-frame time. It will be appreciated that only management and data frames are used for the creation of chains.

Chains grow by adding new links where a rule for joining a chain is that the sender address of the frame should not currently exist on the chain (since a STA cannot contend with itself). Associated with the chain is a time-to-live (TTL) parameter that is updated every time a new frame is captured with the inter-frame time. When the TTL expires, the chain is terminated and its length recorded.

Every time a frame is captured, a new chain is started with its first link consisting of the sender address of the captured frame and its TTL parameter is initialized. The captured frame also attempts to join the existing chains but only if its sender address does not currently exist on the chain. As frames are captured, new chains are created, existing chains grow, and expired chains are terminated.

Essentially, this method determines how long a chain can grow within the TTL interval or in the context of the MAC operation how many STAs on average have transmitted a frame within the TTL interval. By setting the TTL interval to approximately the duration of the contention window, this produces the average contention.

$$AverageContention = \frac{\sum chain\_length}{\sum chains} \quad (28)$$

The above method describes how the average contention on the wireless medium may be obtained. However, this is not necessarily the average contention as experienced by an individual STA. Depending on their respective loads, different STAs will experience different levels of contention. Consequently, it will be appreciated that for a complete picture it is necessary to differentiate between the average medium contention and the average STA contention.

The average medium contention is the average contention experienced by the medium or the number of STAs on average competing for access to the medium. The algorithm for measuring the average medium contention is described above where all chains are considered in the calculation of (28), i.e.

$$Average\_Medium\_Contention = \frac{\sum chain\_length}{\sum chains} \quad (29)$$

Figure 8:
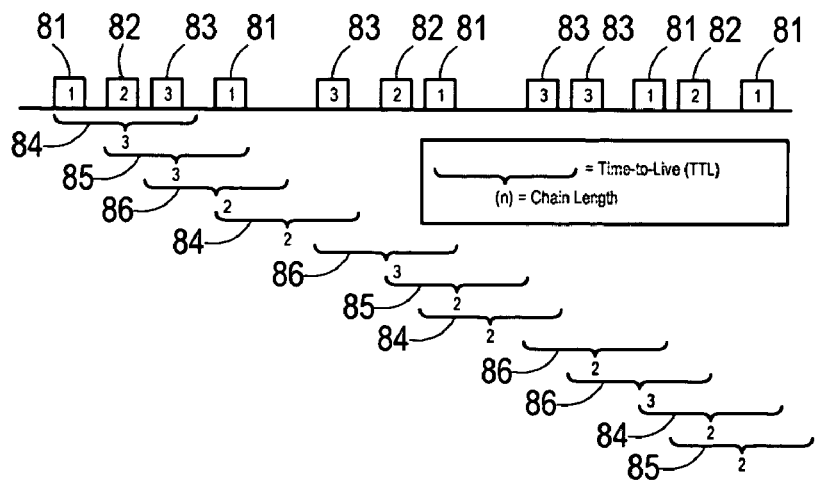
FIG. 8 is a graphical representation of an exemplary method for measuring the average contention.

Thus with reference to the exemplary example shown in FIG. 8, where there are a series of frames being transmitted 81, 82, 83 for a first, second and third station respectively. The arrival of each frame 81, 82, 83 establishes a corresponding chain 84, 85, 86. It will be noted as shown in FIG. 8, that the TTL for the individual chains ignores the time intervals when frames are being transmitted and instead calculates the remaining TTL from inter-frame times.

$$AverageMediumContention = \frac{\sum chain\_length}{\sum chains}$$
$$= \frac{3+3+2+2+3+2+2+2+3+2+2}{11}$$
$$= \frac{26}{11}$$
$$= 2.36$$

and in the case where the $k^{th}$ Station is the first (i.e. k=1)

$$Average\_STA\_Contention(k) = \frac{\sum chain\_length(containing\, STA_k)}{\sum chains(containing\, STA_k)}$$
$$= \frac{3+3+3+2+2}{5}$$
$$= \frac{13}{5}$$
$$= 2.6$$

The average medium contention measurement may be used to obtain the probability of collision ρ which in turn allows the average IFS time $T_{IFS}$ to be calculated using equation 26.

The average STA contention is the average contention experienced by an individual STA or the number of STAs on average competing against the individual STA for access to the medium. In other words, it is only necessary to consider those contention periods in which a particular STA is competing for access. In terms of the average contention method for an individual station, this means that only those chains containing the sender address of the STA are considered in the calculation of (28), i.e.

$$Average\_STA\_Contention(k) = \frac{\sum chain\_length(containing\, STA_k)}{\sum chains(containing\, STA_k)} \quad (30)$$

The average STA contention measurement may be used to obtain the $\overline{\#}_{defers}$ and $\overline{BC}$ on an individual STA basis. The $\overline{\#}_{defers}$ and $\overline{BC}$ for an individual station allows $T_{access}$ for the individual station to be calculated using equations (23)-(25).

Figure 9:
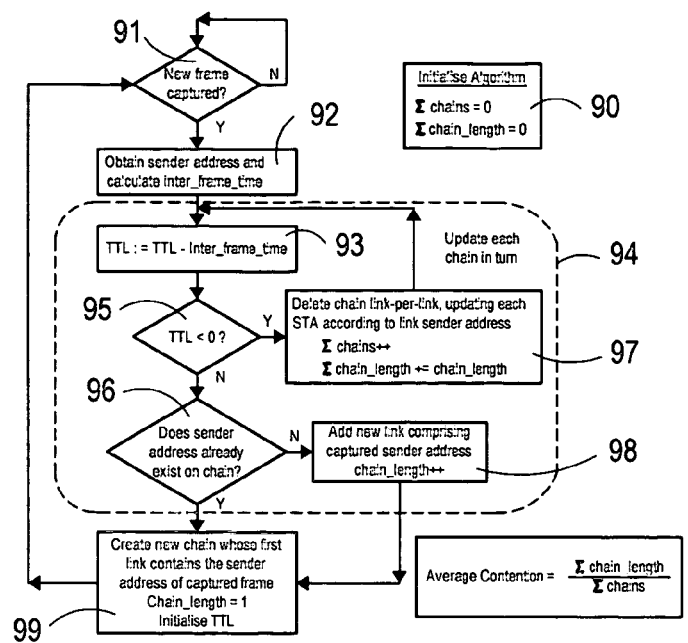
FIG. 9 is a flowchart for implementing the method of FIG. 8.

An exemplary method for obtaining the average contention, as shown in the flowchart of FIG. 9, as may be implemented in the analyzer will now be explained. At the start of the measurement interval of interest, the values are initialized (Step 90). In particular, the number of chains is initialized, i.e. Σchains=0, and the accumulated chain lengths is also initialized, i.e. Σchain_length=0.

When a new frame is captured (Step 91), its MAC header is parsed to determine the sender address (Step 92). In addition the inter-frame-time is calculated from its time stamp.

On the first run through the method, there are no chains in existence and the frame is added as the first link in the chain (Step 99) and assigned the predetermined time to live, i.e. the group of steps highlighted within block 94 are skipped.

On subsequent runs through the method, the next step after extracting the sender address and calculating the inter-frame-time, is to update each of the existing chains in turn (group of steps 94). The TTL parameter is updated (Step 93) from the inter-frame-time (e.g. by subtraction). A check is then performed (Step 95) to determine if the updated TTL is less than zero, the chain is considered to have expired and is deleted. The actual procedure for deleting a chain involves deleting each link of the chain in turn and updating the STA contention statistics (i.e. Σchains and Σchain_length) according to the link sender address (Step 97). This allows the average_STA_contention parameter to be calculated. On the other hand if the updated TTL is greater than or equal to zero, the sender address of the captured frame attempts to join (Step 98) the chain as a new link provided that a check (Step 96) determines that the address does not already exist on the chain. When all existing chains have been updated, a new chain is formed (Step 99) (whose first link is the sender address of the captured frame) and its TTL is initialized.

At the end of the measurement interval the average_medium_contention and average_STA_contention may be calculated using equations 29 and 30. Both of these values may be regarded as performance values and thus for example be displayed in a graphical user interface or for example employed in a traffic management or QOS scheme. As mentioned above, the preferred method employed in the traffic probe of the present invention is to compute the values of the parameters $\rho$, $\overline{\#}_{defers}$, and $\overline{BC}$ offline as a function of the average contention. A "look up table" approach may then be used to obtain the values of these parameters from measured values of the average medium and STA contention.

The requirement here is to calculate the parameters $\overline{\#}_{defers}$, $\rho$ and $\overline{BC}$ as function of the average contention. The easiest method is to use computer simulation where the 802.11 MAC is implemented as a computer program. In the present case, the inventors wrote a simulation in C/C++ to do this.

The simulator was run under STA saturation conditions, i.e. where all STAs in the simulation always have a frame to transmit. The consequence of this is that the average contention is simply the number of STAs in the simulation and this allows the values of $\overline{\#}_{defers}$, $\rho$ and $\overline{BC}$ be computed for integer values of average contention.

Figure 10:
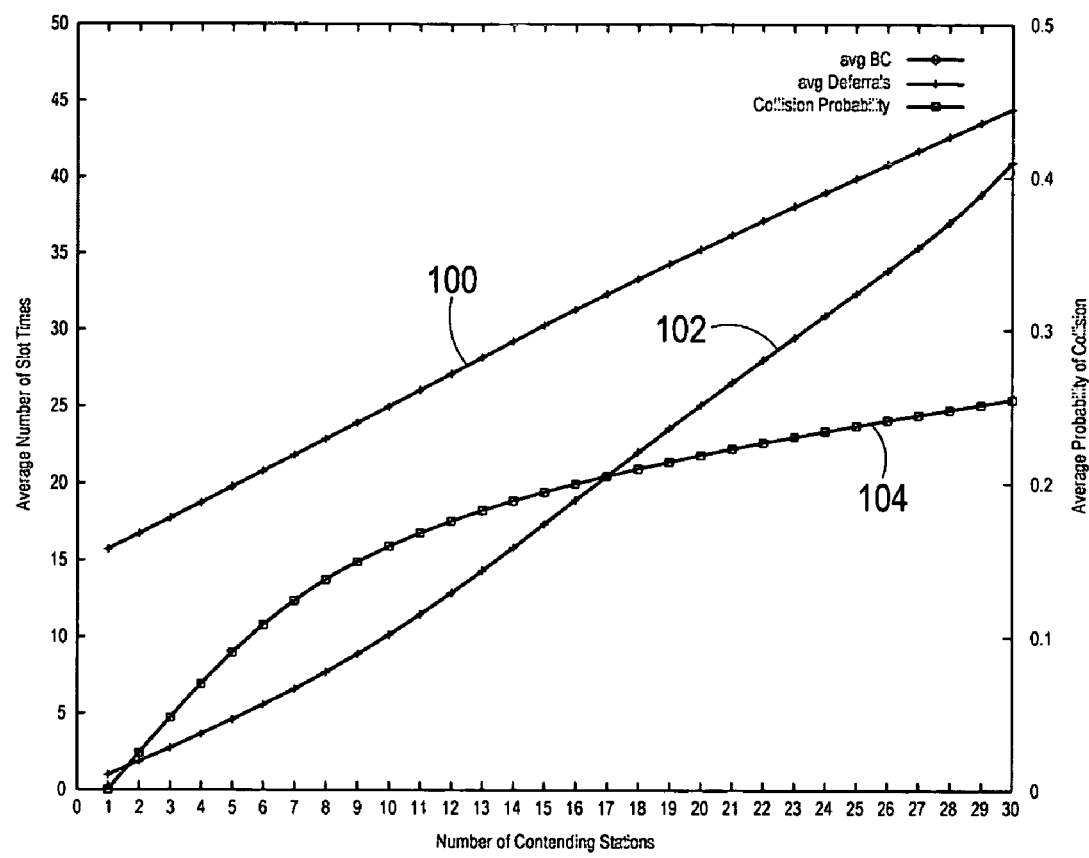
FIG. 10 is a graphical representation of simulation results for use in the method of the present invention.

The number of STAs was increased from 1 to 30 stations and at each step the values of $\overline{\#}_{defers}$, $\rho$ and $\overline{BC}$ were measured from the simulation. The results of which are shown for the average value of the backoff counter 100, average number of deferrals 102 and the probability of a collision 104 in FIG. 10. Although, these figures may be readily applied to integer values of average contention, interpolation or a similar technique may be required for non-integer values.

One method is to use curve fitting to fit a curve to the calculated integer points in order to allow the parameter values for non-integer values of average contention to be obtained.

For example, in the case of the average initial backoff counter value $\overline{BC}$, the inventor has determined that it is possible to fit a quadratic curve of the following form to the simulated data, $$y=a+bx+cx^2$$

where a=14.03, b=1.20, c=−0.02, y is the backoff counter value and x the average station contention.

In a similar fashion, the inventor has determined that it is possible to fit curves to the other two parameters $\overline{\#}_{defers}$ and $\rho$. Consequently, by measuring the average medium and STA contention, it is possible to infer the values of the parameters $\overline{\#}_{defers}$, $\rho$ and $\overline{BC}$ which in turn allows $T_{access}$ to be calculated.

The average number of deferrals $\overline{\#}_{defers}$ may, for example, be fitted using a nonlinear shifted power curve of the type:

$$y=a(x-c)^b+d$$

in which suitable values for the coefficients are a=0.7849, b=1.16, c=−0.4335, d=−0.2441.

The average initial BC value may, for example, be fitted using a quadratic curve of the type:

$$y=a+bx+cx^2$$

in which suitable values for the coefficients are a=14.03, b=1.119, c=−2.004×10⁻³.

The average probability of collision $\rho$ may, for example, be fitted using a nonlinear shifted power curve of the type:

$$y=a(x-c)^b+d$$

in which suitable values for the coefficients are a=0.1868, b=0.2619, c=0.2374, d=0.1825.

It will be appreciated that a variety of different curves may be used for each of the parameters $\overline{\#}_{defers}$, $\rho$ and $\overline{BC}$.

The present invention uses a frame capture product (described below). The particular frame capture product as with other packet capture software products only captures uncorrupted frames, i.e. it does not pass back frames that have been corrupted due to transmission errors or collisions. Since corrupted frames can be neither captured nor processed, the problem is how to account for the time on the medium used during the transmission of these frames.

However the inventor has realized that it is possible to observe collisions and transmission errors indirectly via their subsequent re-transmission attempts. The MAC header on every frame contains a retry flag which when raised indicates that the frame is a re-transmission attempt. If a frame is captured with its retry flag raised, then clearly the frame represents a re-transmission attempt or in other words there must have been an earlier unsuccessful transmission attempt.

There is therefore a requirement to identify the sender of the corrupted frame. In the case of a frame that has been corrupted due a transmission error, identifying the STA involved is straightforward as there is only one STA involved. However, a problem arises when a collision occurs as there will be two or possibly more STAs involved.

Consequently, in order to account for transmission errors and collisions, there may be two general requirements:

Need to determine whether a transmission error or a collision has taken place.

If a collision has occurred, there is the additional requirement to identify the STAs involved.

A useful method for distinguishing between transmission errors and collisions is to exploit the correlation between re-try frames.

Since transmission errors tend to occur randomly and singly, the inventor has realized that there should be negligible correlation between retry attempts by different STAs arising from transmission errors. Conversely, since collisions involve at least two STAs, there should be a high degree of correlation between retry attempts. In a WLAN containing N STAs, the retry frames resulting from a collision should occur within N frames of one another. Consequently, if two retry attempts occur within N frames of one another there is a high probability that they have arisen from a previous collision. On the other hand, if two retry attempts occur more than N frames apart, there is a high probability that they are uncorrelated and have arisen from previous independent transmission errors.

Figure 11:
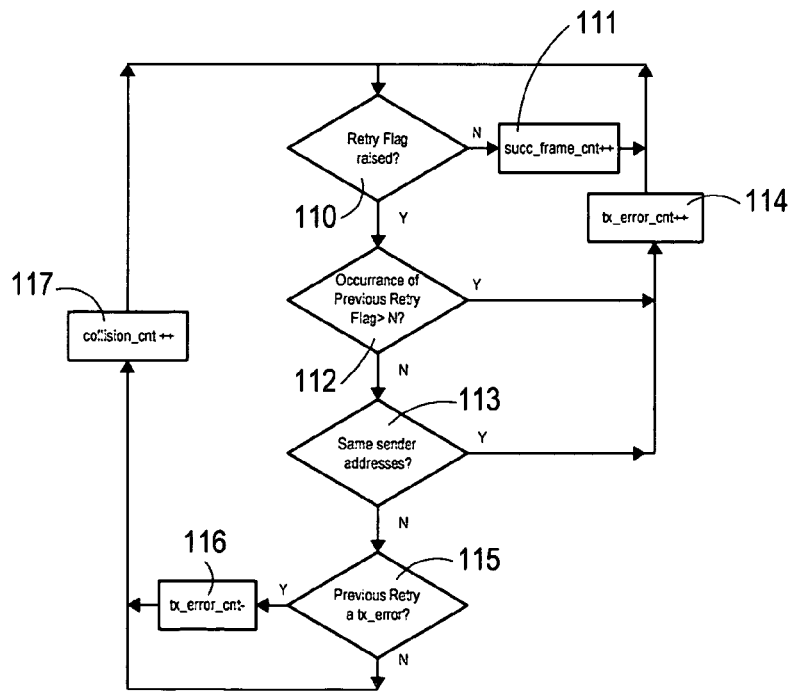
FIG. 11 is a flowchart of an exemplary method for identifying and counting transmission errors and collisions.

The inventor has exploited this and developed a method of identifying and counting transmission errors and collisions which may be applied in an analyzer and which will now be explained with reference to the flowchart of FIG. 11. In brief, the method seeks to distinguish between failures arising from transmission errors and collision errors by reference to the degree of correlation between retransmitted frames.

Specifically, as each new frame is captured, the retry flag in its MAC header is examined 110 to see if it is raised. If the retry flag is not raised, then the frame was successfully transmitted and a successful frame count parameter (succ_frame_cnt) is incremented 111. If the retry flag has been raised, then it is assumed that there has been a previously unsuccessful attempt to transmit this frame. The next step is to determine 112 whether the attempt failed as a result of a transmission error or a collision by measuring how closely the current and previous retry attempts are correlated. This is done by examining the correlation between the frames by counting the number of successful (i.e. first attempt) frames that have occurred between the two retry attempts (i.e. the succ_frame_cnt parameter). If the two retry attempts occur more than N frames apart, where N is the number of active STAs within the WLAN, then they are considered to be uncorrelated, and hence the current retry attempt is assumed to be the result of a transmission error. In this case, an error count parameter (tx_error_cnt) is incremented 114.

However, if current and previous retry attempts occur within N frames of each another, then they are considered to be correlated and hence are assumed to be the result of a previous collision. In this case, a collision count parameter is incremented 117.

If the previous retry attempt was erroneously recorded as a transmission error, i.e. the correlation only becomes apparent after receipt of the subsequent frame from the other station involved in the collision, this may be corrected by decrementing 116 the error count parameter (tx_error_cnt).

The STAs involved in the collision (or an error) may be identified from the sender addresses of the retry frames.

The total frame count for an individual station may therefore be stated as the number of frames transmitted successfully along with the number that had to be retransmitted arising from errors and collisions, i.e.

$$\text{frame\_cnt} = \text{succ\_frame\_cnt} + \text{tx\_error\_cnt} + \text{collision\_cnt} \quad (31)$$

The total frame count may be used in equation 27 to obtain the access time $T_{access}$ and accordingly the $BW_{access}$ for an individual station.

Figure 12:
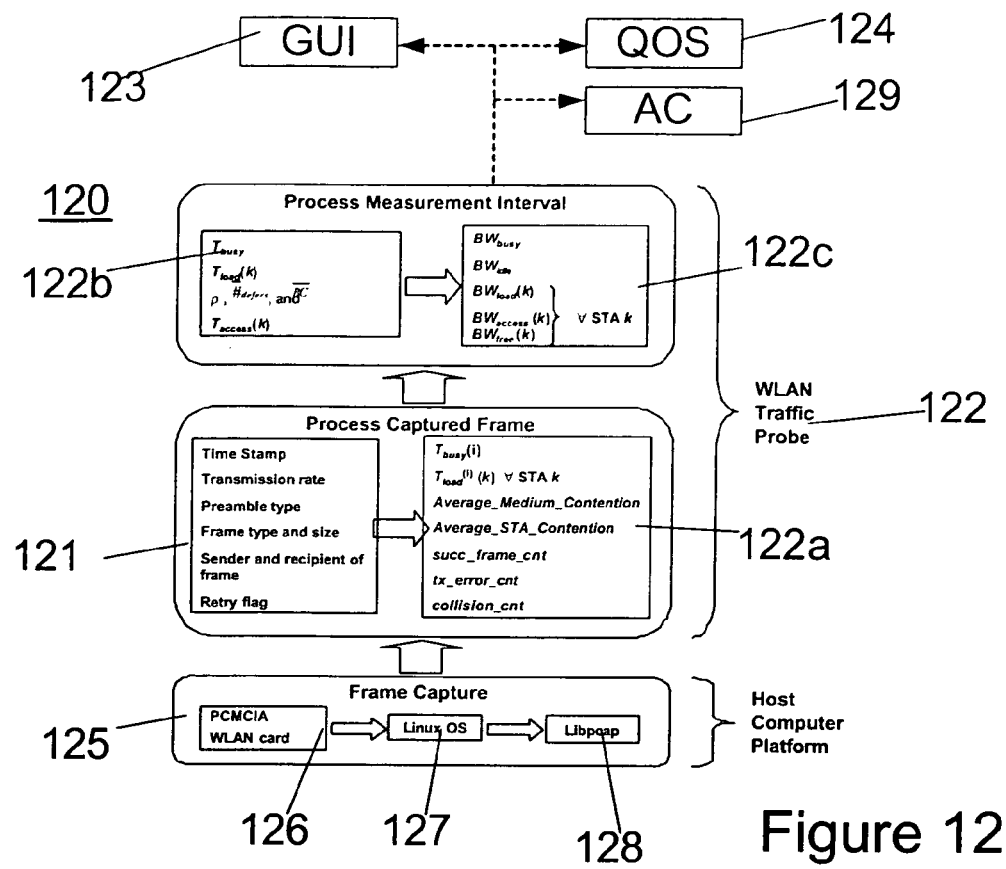
FIG. 12 is a representation of the structure of a traffic probe according to the invention.

The various operations and procedures comprising the probe 120, as shown in FIG. 12, may be divided into three categories: Capturing the frame, processing the captured frame, and processing the information gathered over the duration of the measurement interval to produce one or more performance values 122a, 122b, 122c. The latter two processing functions are performed by the analyzer 122 of the traffic probe.

The processes concerned with capturing the individual frames and extracting the frame metrics from the frames are well known to those skilled in the art. Accordingly, a detailed explanation of the process is not described herein, other than to describe an exemplary software package for performing this task. In brief, the system comprises a host computer platform 125 having a WLAN device 126 for receiving transmitted frames. For example, the WLAN device may take the form of an 802.11 network interface card, which in turn may take the form of a PCMCIA card operating in a promiscuous mode. The host platform has a suitable operating system 127, e.g. Linux, which is responsible for managing the hardware interactions between the PCMCIA WLAN card and the rest of the computer platform. A suitable software package, e.g. Libpcap, can be used to provide for implementation-independent access to the underlying frame capture facility provided by Linux and the PCMCIA WLAN card. Essentially, libpcap is a wireless frame capture library that provides a high level interface to frame capture systems. All wireless frames on the WLAN, even those destined for other hosts, are accessible through this mechanism.

Once a frame has been captured on the wireless medium. The captured frame is handed over to the analyzer of WLAN traffic probe application in its entirety together with a time stamp giving the time of capture. The analyzer is a suitably written software program incorporating the methods and calculations described above. The information is then used to determine a series of performance values, illustrated in FIG. 13, for both the wireless medium itself and also the individual stations. One or more of these values may be produced by the probe and presented to a user through a graphical user interface 123 and/or used in a traffic provisioning 129 or quality of service 124 scheme. The first task is to parse the PLCP and MAC headers in order to obtain the relevant information (frame metrics) from the frame 121. This information includes the transmission rate, the type of PLCP preamble used, the frame type and size, the sender and intended recipient of the frame, and various status flags, the most important of which for the operation of the probe is the retry flag.

Figure 13:
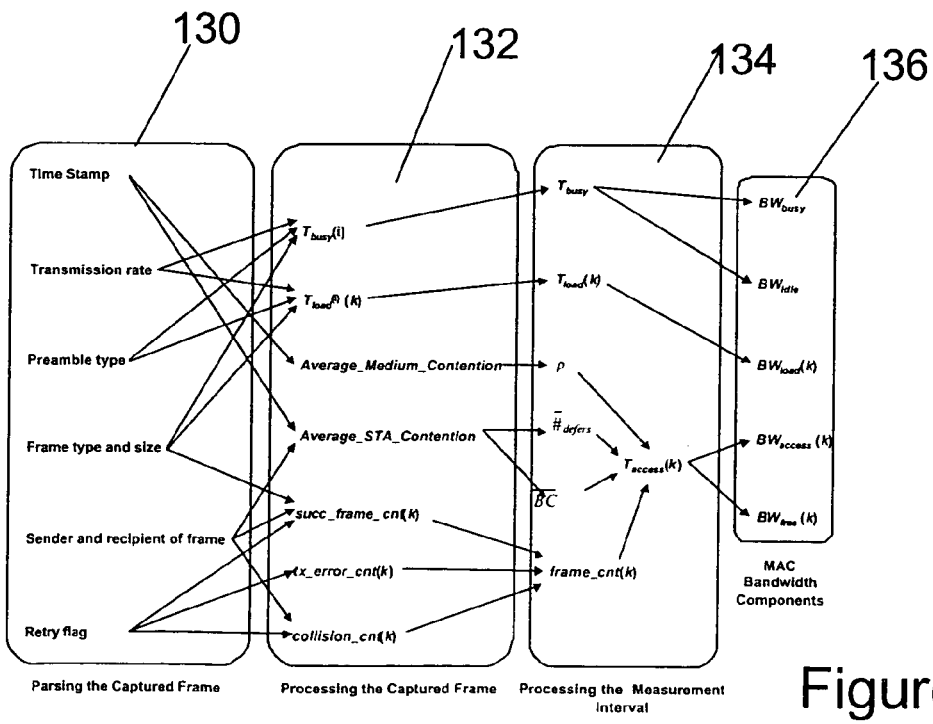
FIG. 13 is a graphical representation of the relationships between the various measurements as used in an exemplary traffic probe of the present invention.

A summary of the flow process for the determination from the frame metrics 130, into a first set intermediate values 132 (which includes a number of performance values), followed by a second set of intermediate values 134 (which also includes a number of performance values) and a final set of values representing the MAC bandwidth components is illustrated in FIG. 13.

In particular, the transmission rate, preamble type, and frame size and type may be used to calculate the duration of the busy interval $T_{busy}(i)$. Summing over all the busy intervals $T_{busy}(i)$ within the measurement interval gives $T_{busy}$ which allows $BW_{busy}$ and hence $BW_{idle}$ to be obtained. Sorting the captured frames by their sender address allows $T_{load}^{(i)}(k)$ to be measured which when summed over all the transmissions from a particular STA k allows $T_{load}(k)$ and hence $BW_{load}(k)$ to be calculated for that station.

The frame sender address together with the time stamp are used by the average contention algorithms to measure the Average_Medium_Contention and Average_STA_Contention parameters. The former is used to infer the probability of collision $\rho$, while the latter is used to infer the average number of deferrals $\overline{\#}_{defers}$ and average initial backoff counter $\overline{BC}$ on a per-STA basis. The relationship between the average contention and the $\overline{\#}_{defers}$, $\rho$ and $\overline{BC}$ parameters may be computed off-line using, for example, computer simulation.

The frame sender address in conjunction with the retry flag is used to count the successfully transmitted frames, transmission errors, and collisions for each STA which in turn gives the total STA frame count frame_cnt(k). The average access time for a STA is obtained from the $\overline{\#}_{defers}$, $\rho$ and $\overline{BC}$ parameters and the total STA frame count frame_cnt(k) which allows $BW_{access}(k)$ and finally $BW_{free}(k)$ to be calculated.

From these initial performance values further performance values may be derived including for example the ratio of access and load bandwidths for individual stations (Access to load ratio=$BW_{access}/BW_{load}$), or the ratio of the busy and idle bandwidths for the overall LAN. Similarly, a performance value for the efficiency of transmission by an individual station may be defined as $BW_{load}/(BW_{load}+BW_{access})$.

One of the advantages provided by the probe of the present invention is its non-intrusive nature by which the probe operates passively, "sniffing" the wireless frames on the medium. The probe does not in any way interfere with the traffic flow on the WLAN. A further advantage is that it specifically addresses operation at the L2/MAC layer. Unlike current commercially available WLAN analyzers, which are essentially network protocol analyzers (and as such do not give any indication of performance in terms of radio resource usage), the traffic probe specifically addresses the operation of the MAC mechanism in terms of how it determines resource usage. The concept of MAC bandwidth components gives a useful descriptive framework for WLAN resource usage that is both compact and intuitive. Unlike existing systems it may be used to provide a realistic advanced warning of the onset of saturation. As the probe shows the WLAN resource usage on per-station basis, it can indicate the spare capacity remaining and therefore may be used to give an advanced warning of the on-set of saturation. As a result, it is ideally suited to traffic engineering schemes. Advanced automated measurement-based traffic engineering schemes such as admission control and quality of service provisioning require fast yet accurate measurements to be performed on the network traffic in order to efficiently manage the available resources. The probe's features outlined above make it ideally suited to this task. The probe also facilitates the identification of destructive users and the quantification of their effect on other network users. Once a destructive user has been identified, a network manager or automated software can remove the destructive user using a process such as disassociating the user from the network to effectively remove the user from the network or, for example alternatively, by instructing the user to re-associate and then subsequently refusing the re-association request.

Figure 14:
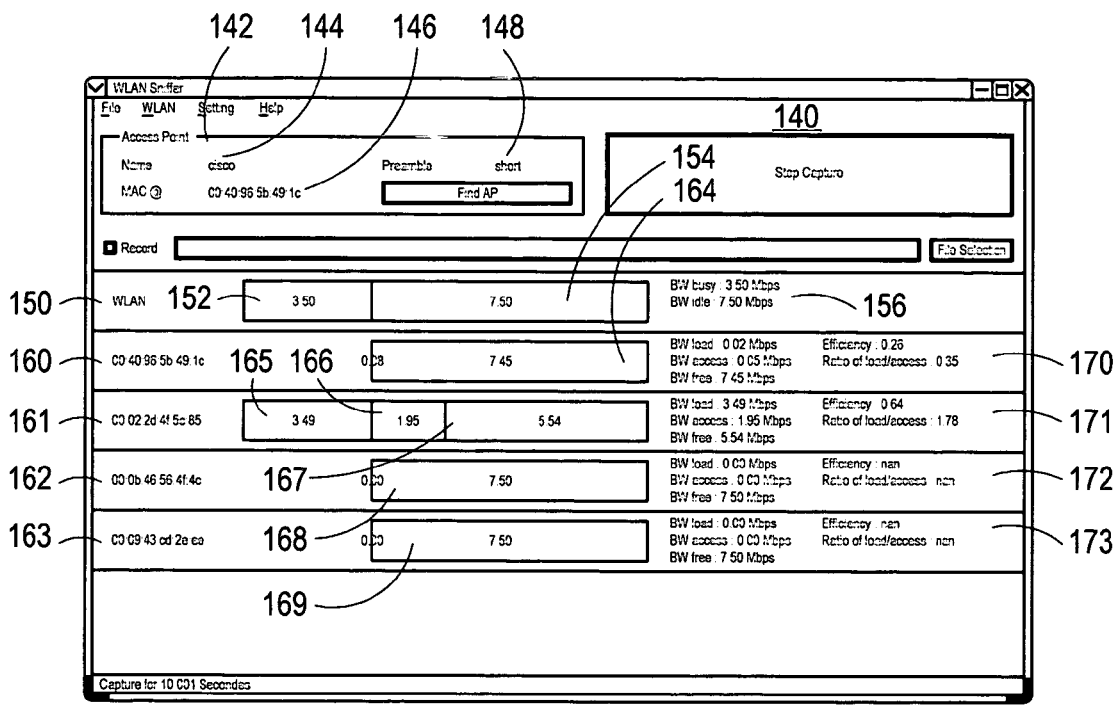
FIG. 14 is an exemplary graphical user interface according to the invention.

An exemplary mode of operation of the probe will now be described in greater detail in which the performance values are displayed on a graphical user interface. An exemplary screen shot of the graphical user interface is shown in FIG. 14.

The graphical user interface 140 may display some generic information 142 about the access point of the WLAN, including the name of the access point 144, the type of preamble used 148, and the MAC address 146 of the access point. In this context, it will be appreciated to those skilled in the art that each station on a WLAN is identifiable by its MAC address.

The graphical user interface may display each of the calculated performance values individually or in combinations. In this regard, it will be appreciated that certain performance values may be grouped advantageously in combinations on the display. These would include the combination of idle and busy bandwidths and the combination of load, access and free bandwidths for individual stations.

The graphical user interface may have a section 150 in which the overall LAN performance is demonstrated, i.e. by displaying performance values such as for example the busy bandwidth, the idle bandwidths 156, probability of a collision and/or the average medium contention. As users tend to find graphical (as compared to textual) representations easier to comprehend, one or either of the bandwidths (idle and busy) may be displayed in the form of a bar graph display. Suitably, the bar graphs for the idle and busy bandwidths may be juxtaposed. Advantageously, the busy bandwidth 152 may be represented in red and the Idle bandwidth may be represented in green to give users an intuitive view of network resources.

The graphical user interface may also be arranged so that each individual station has a section in which the performance values for that station are displayed. Each station (section) may be identified by the MAC address of the station 160, 161, 162, 163.

Each of the individual stations is displayed as a separate block on the screen. In the exemplary screen shot shown, each station is shown with a MAC bandwidth component in the form of a bar display. The exemplary embodiment shows the free bandwidth 164, 167, 168, 169 for each station as a bar display. Where a station is transmitting data, separate juxtaposed bars are shown to illustrate the access 166 and load 165 bandwidth values.

In operation, the graphical user interface may be adapted to only display active stations. Thus if a station does not transmit a frame for a certain predefined period, e.g. two minutes, it may be assumed to be inactive and the graphical user interface may respond by clearing the display of any information for that station. Similarly, as a station joins the network, the graphical user interface may respond by creating a section in the display for the new station.

The graphical user interface is intended to be dynamic and thus the display may be refreshed periodically (e.g. every second) with fresh measurements of performance values.

The graphical user interface may also display one or more performance values for the individual stations in textual form 170, 171, 172, 173.

Further functionality may be incorporated in the graphical user interface. For example, the graphical user interface, may be adapted to display a historical display for one or more users or the WLAN of one or more performance values. Thus, a network manager could assess the impact a particular station is having over time rather than at a particular instant. The graphical user interface may have a feature allowing a user to select a particular station for removal from the WLAN. In response to which, the GUI would cause an instruction to this effect to be issued to the traffic engineering/admittance scheme.

The use of the GUI application of the WLAN traffic probe enables the network operator/administrator to monitor resource usage and available capacity in real-time and on a per-station basis without interfering with the normal traffic flow.

Unlike current WLAN management tools that are essentially network protocol analyzers (and as such do not give any indication of performance in terms of radio resource usage), the traffic probe of the present invention specifically addresses the operation of the CSMA/CA MAC mechanism from the perspective of radio resource usage. Consequently, the probe is capable of producing the type of resource information required for admission control and quality of service provisioning schemes.

In this respect, a more advanced application of the traffic probe would be in an automated measurement based radio resource management scheme possibly incorporating admission control which will be discussed below. In this arrangement, the probe may be used to continually monitor and report on WLAN performance as part of a radio resource control algorithm in order to ensure stable, predictable performance. Such a scheme would typically be deployed at an access point as part of a WLAN service, e.g. a "Wi-Fi hot-spot" service.

Although, a traffic engineering scheme may be readily implemented in an access point by using the WLAN device of the access point to measure the performance of the network, it will be appreciated that in such an arrangement, the AP cannot monitor the medium when it is transmitting. Nonetheless, the contribution of the AP to the network traffic may be directly obtainable since the AP will know what and when it is transmitting.

Figure 15:
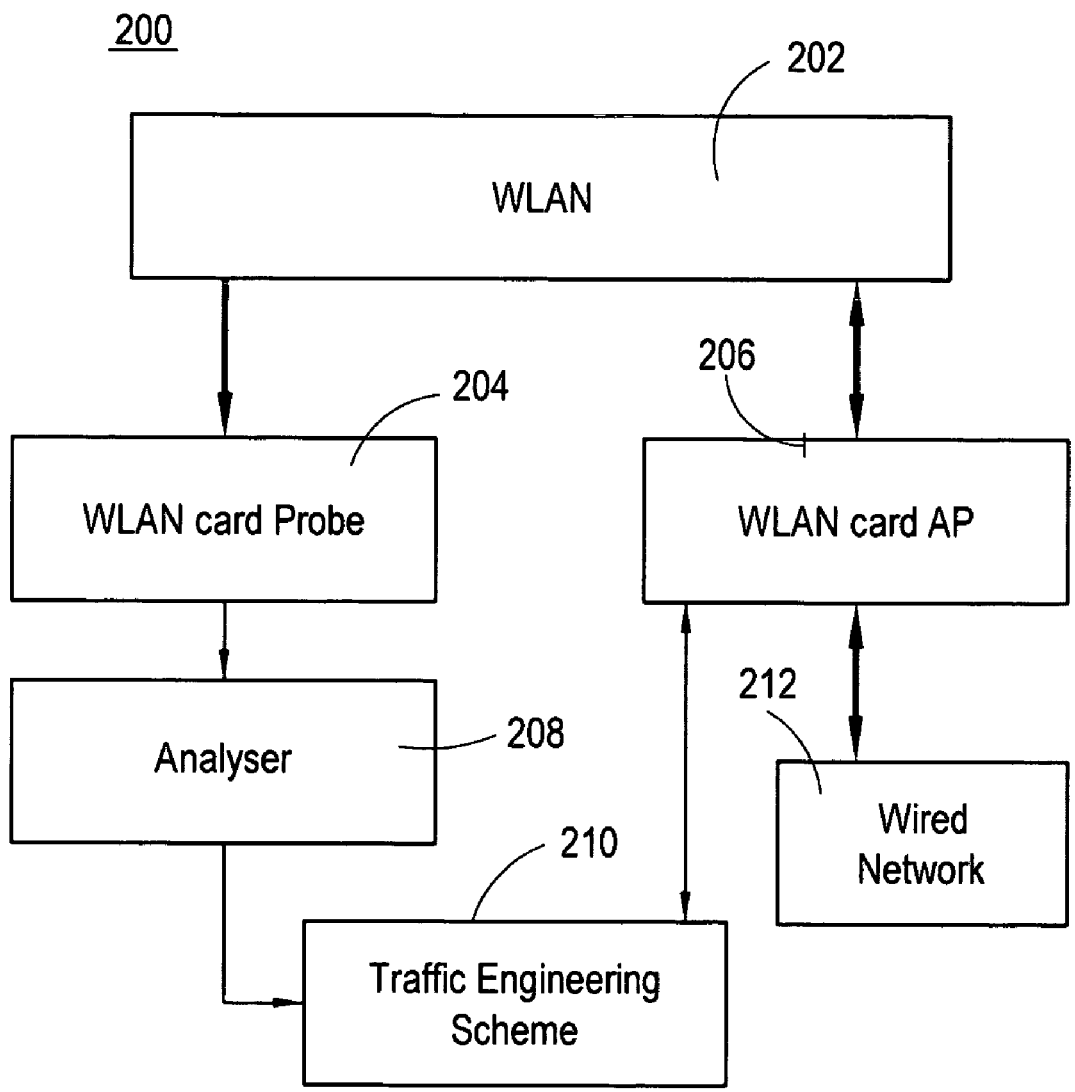
FIG. 15 is an exemplary access point incorporating the probe of the present invention in a traffic engineering arrangement.

However, the exemplary probe described above may be directly applied to an access point without having to do this through the use of a second WLAN card installed on the AP as shown in FIG. 15. In this context, it will be appreciated that any computer 200 with a suitable onward network connection 212 may be used as an access point, for example a simple computer on a card with two PCMIA slots for housing WLAN PCMIA cards and having an Ethernet wired connection. In this arrangement, the first wireless LAN device 206 would serve as an access point for the WLAN, allowing users to access the wired network 212. The second WLAN device 204 would be configured to operate as a probe (as described above) listening to the traffic on the WLAN. An analyzer (as described above) would obtain the frame information from the second LAN device and process this to obtain performance values for the network and/or individual stations. These performance values may then be forwarded to a traffic engineering scheme controller, which is adapted to respond to the performance value.

For example, in the context of admission control, the performance value(s) may be used to admit new stations to the network only if there are sufficient resources available to do so, i.e. if the performance values were above\below a predetermined level, e.g. if the Idle Bandwidth or the average medium contention was less than a predetermined value. In addition, the possible impact (of admitting a new station) on the existing stations could also be assessed. The WLAN probe may also be used to give the current status of the WLAN in terms of the resource usage on a per-station basis and as such also give a measure of the available resources when admitting new stations.

Another related aspect is that the WLAN traffic probe may be used to allow a network administrator to identify disruptive users (and additionally to quantify the impact of a disruptive user on other users) and if necessary drop them from the network. In the context of the Traffic Engineering Scheme, users could be de-admitted if their performance values were above a first threshold for long periods. This process may be refined to be applied only in circumstances where it was to the detriment of others, i.e. where the performance values for other users fell below a second threshold Another place the probe may be applied in an automated measurement-based RRM (radio resource management) scheme, e.g. using the exemplary arrangement shown in FIG. 15. In such a scheme (permitted for example under IEEE 802.11e) different stations may be assigned different priorities based on their requirements. One aspect of such a scheme is the ability to perform accurate and timely measurements on the current state of the resource usage of the network on a per-station basis, i.e. the performance values described above. This information may then be fed into a control algorithm within the traffic engineering scheme 210 so as to adaptively adjust the operation of the network in order to satisfy the particular quality of service (QoS) targets for the users, e.g. the scheme may employ traffic shaping to throttle back heavy traffic streams.

Although, the present invention has been described primarily in relation to the IEEE 802.11 specification, it will be appreciated that it may be readily applied to any frame based distributed transmission system employing CSMA/CA techniques.

It is appreciated that certain features of the invention, which are, for clarity, described in the context of separate embodiments, may also be provided in combination in a single embodiment. Conversely, various features of the invention which are for brevity described in the context of a single embodiment, may also be provided separately or in any suitable sub-combination.

Moreover, it will be appreciated that whilst individual performance values may have been described separately, they may be used concurrently in any combination for a multitude of purposes including admission control, quality of service provisioning and/or displaying information to a user about a WLANs operation.

The words comprises/comprising when used in this specification are to specify the presence of stated features, integers, steps or components but does not preclude the presence or addition of one or more other features, integers, steps, components or groups thereof.

While the particular Wireless Probe as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A traffic analysis system for providing at least one performance value for a wireless LAN, the traffic analysis system comprising:
    a receiver for receiving a sequence of frames, beginning with a first frame, transmitted over the wireless LAN, the frames including packets and headers,
    a frame parser for selectively extracting frame information from the packets and headers of the received frames, and
    an analyser for analysing the frame information over a predetermined interval to provide the at least one performance value, wherein the at least one performance value comprises a contention value to minimize collisions upon entry onto the wireless LAN when transmissions are sent from a plurality of individual stations, wherein the predetermined interval begins upon receipt of the first frame, and wherein each performance value comprises a Medium Access Control (MAC) layer bandwidth component, and wherein the analyser provides each performance value by calculating the fraction of the predetermined interval occupied by the respective MAC layer bandwidth component.

2. A traffic analysis system according to claim 1, wherein the MAC layer bandwidth component is a load bandwidth for an individual station representing the fraction of the predetermined interval occupied by the transmission of data frames from the individual station on the wireless LAN.

3. A traffic analysis system according to claim 1, wherein the MAC layer bandwidth component is a load bandwidth for an individual station representing the fraction of the predetermined interval occupied by the transmission of data frames to the individual station on the wireless LAN.

4. A traffic analysis system according to claim 1, wherein the MAC layer bandwidth component is an access bandwidth for an individual station representing the fraction of the predetermined interval associated with a contention mechanism for the individual station operating on the wireless LAN.

5. A traffic analysis system according to claim 1, wherein the MAC layer bandwidth component is a free bandwidth for an individual station representing the fraction of the predetermined interval available to the individual station for transmission of data on the wireless LAN.

6. A traffic analysis system according to claim 1, wherein the MAC layer bandwidth component is a busy bandwidth representing the fraction of the predetermined interval in which frames were transmitted.

7. A traffic analysis system according to claim 1, wherein the MAC layer bandwidth component is an idle bandwidth representing the fraction of the predetermined interval in which frames were not transmitted.

8. A traffic analysis system according to claim 1, wherein the bandwidth is expressed as a fraction of the line rate.

9. A traffic analysis system for a wireless LAN for providing at least one performance value comprising:
   a receiver for receiving a sequence of frames, including a first frame, transmitted over the wireless LAN, the frames including packets and headers,
   a frame parser for selectively extracting frame information from the packets and headers of individual frames received, the frame information including a station identifier for each individual frame and a time stamp, the station identifier identifying the station which transmitted the frame, and
   an analyser for analysing the extracted station identifiers, the analyser being adapted to determine the at least one performance value, wherein each performance value comprises a contention value for an individual station to minimize collisions upon entry onto the wireless LAN when transmissions are sent from a plurality of individual stations, wherein the analyser determines each performance value by counting the number of other individual stations identified in frames after the receipt of the first frame from the individual station and within a predefined time to live period beginning with receipt of the first frame from the individual station, and wherein the predefined time to live period is calculated with respect to inter-frame time durations.

10. A traffic analysis system according to claim 9 wherein the analyser is adapted to average a series of contention values obtained for the individual station during the predefined time to live period to provide an average contention value for the individual sender.

11. A traffic analysis system according to claim 10 wherein the analyser is further adapted to use the average contention value to determine a figure for the average number of deferrals incurred by the individual station.

12. A traffic analysis system according to claim 11 wherein the analyser is adapted to determine said figure for the average number of deferrals by applying the average contention to a look-up table or algorithm.

13. A traffic analysis system according to claim 12 wherein the analyser is further adapted to use the average contention value to determine a figure for the average value of the individual station's backoff counter.

14. A traffic analysis system according to claim 13 wherein the analyser is adapted to determine said figure for the average value of the individual station's backoff counter by applying the average contention value for the station to a look-up table or algorithm.

15. A traffic analysis system according to claim 9, wherein the analyser is adapted to obtain all contention values for all stations transmitting frames during a predefined period and to average the calculated contention values to determine an average contention value for the wireless LAN.

16. A traffic analysis system according to claim 15, wherein the analyser is further adapted to determine a probability factor for a collision on the wireless LAN from the determined average contention value for the LAN.

17. A traffic analysis system according to claim 16, wherein the analyser is adapted to determine said probability factor by applying said average contention value to a look-up table or algorithm.

18. A traffic analysis system for providing at least one performance value for a wireless LAN, comprising:
   a receiver for receiving a sequence of frames, including a first frame, transmitted over the wireless LAN, the frames including packets and headers,
   a frame parser for selectively extracting frame information from the packets and headers of individual frames received during a predetermined period beginning with receipt of the first frame, the frame information including a sender identifier for each individual frame and a retry flag indicating whether the individual frame was being retransmitted because of a previous transmission failure, and
   an analyser for identifying types of transmission failure, the analyser being adapted to distinguish between failures arising from transmission errors and failures arising from collision errors by reference to the degree of correlation between retransmitted frames, wherein an identification of transmission failures is used to provide the performance value, and wherein the performance value further comprises a contention value to minimize collisions upon entry onto the wireless LAN when transmissions are sent from a plurality of individual stations.

19. A traffic analysis system according to claim 18, wherein the at least one performance value comprises a transmission error value for at least one station, and wherein said analyser is adapted to obtain the transmission error value by totalling the number of transmission errors identified for the at least one station within the predetermined period.

20. A traffic analysis system according to claim 18, wherein the at least one performance value is a collision value for at least one station, and wherein the analyser is adapted to obtain said collision value by totalling the number of collisions identified for the respective station within a predetermined period.

21. A traffic analysis system according to claim 18, further comprising a graphical user interface for displaying the at least one performance value.

22. A traffic analysis system according to claim 21, wherein the at least one performance value comprises a performance value for the overall LAN.

23. A traffic analysis system according to claim 22, wherein the at least one performance value comprises a MAC bandwidth value for the overall LAN.

24. A traffic analysis system according to claim 23, wherein the graphical user interface displays the MAC bandwidth value as a graphical representation.

25. A traffic analysis system according to claim 21, wherein the graphical user interface displays a performance value for at least one individual station.

26. A traffic analysis system according to claim 25, wherein the at least one performance value comprises a MAC bandwidth value for the at least one individual station.

27. A traffic analysis system according to claim 23, wherein the graphical user interface displays the MAC bandwidth value for the at least one individual station as a graphical representation.

28. A network admission system adapted to control the admittance of stations to a wireless network comprising the traffic analysis system of claim 18, whereby the admittance of stations to the network is dependent on the at least one performance value determined by the traffic analysis system.

29. A network admission system for controlling the admittance of stations to a network comprising the traffic analysis system of claim 18, the admission scheme further comprising a mechanism for removing an active station from the network in response to a performance value determined by the traffic analysis system.

30. A method of determining at least one performance value for a wireless LAN, comprising the steps of:
receiving a sequence of frames, including a first frame, transmitted over the wireless LAN, the frames including packets and headers,
selectively extracting frame information from the packets and headers of the received frames, and
analysing the frame information over a predetermined interval to provide the at least one performance value, wherein the predetermined interval begins with receipt of the first frame, wherein each performance value comprises a Medium Access Control (MAC) layer bandwidth component, wherein each performance value further comprises a contention value to minimize collisions upon entry onto the wireless LAN when transmissions are sent from a plurality of individual stations, and wherein each performance value is provided by calculating the fraction of the predetermined interval occupied by the respective bandwidth component.

31. A method according to claim 30, wherein the MAC layer bandwidth component is a load bandwidth for an individual station representing the fraction of the predetermined interval occupied by the transmission of data frames from the individual station on the wireless LAN.

32. A method according to claim 30, wherein the MAC layer bandwidth component is a load bandwidth for an individual station representing the fraction of the predetermined interval occupied by the transmission of data frames to the individual station on the wireless LAN.

33. A method according to claim 30, wherein the MAC layer bandwidth component is an access bandwidth for an individual station representing the fraction of the predetermined interval associated with a contention mechanism for the individual station operating on the wireless LAN.

34. A method according to claim 30, wherein the MAC layer bandwidth component is a free bandwidth for an individual station representing the fraction of the predetermined interval available to the individual station for transmission of data on the wireless LAN.

35. A method according to claim 30, wherein the MAC layer bandwidth component is a busy bandwidth representing the fraction of the predetermined interval in which frames were transmitted.

36. A method according to claim 30, wherein the MAC layer bandwidth component is an idle bandwidth representing the fraction of the predetermined interval in which frames were not transmitted.

37. A method according to claim 30, wherein the bandwidth is expressed as a fraction of the line rate.

38. A method according to claim 30 further comprising the step of displaying the at least one performance value to a user.

39. A method according to claim 38, wherein the at least one performance value comprises a performance value for the overall LAN.

40. A method according to claim 39, wherein the at least one performance value comprises a MAC bandwidth value for the overall LAN.

41. A method according to claim 39, wherein the MAC bandwidth value is displayed as a graphical representation.

42. A method according to claim 38, wherein the at least one displayed performance value comprises a performance value for at least one individual station.

43. A method according to claim 42, wherein the at least one displayed performance value comprises a MAC bandwidth value for the at least one individual station.

44. A method according to claim 43, wherein the MAC bandwidth value for the at least one individual station is displayed as a graphical representation.

45. A method for controlling the admittance of stations to a wireless network, wherein admittance is determined by reference to the at least one performance value determined by the method of claim 30.

46. A method of removing an active station from the network in response to a performance value determined by the method of claim 30.

47. A method for determining at least one performance value for a wireless LAN comprising the steps of:
receiving a sequence of frames, including a first frame, transmitted over the wireless LAN, the frames including packets and headers,
selectively extracting frame information from the packets and headers of individual frames received, the frame information including a station identifier for each individual frame, the station identifier identifying the station which transmitted the frame, and
analysing the extracted station identifiers to determine the at least one performance value, wherein each performance value comprises a contention value for an individual station to minimize collisions upon entry onto the wireless LAN when transmissions are sent from a plurality of individual stations, wherein the analyser determines each performance value by counting the number of other stations identified in frames within a predefined time to live period, wherein the predefined time to live period begins with receipt of the first frame from the individual station.

48. A method according to claim 47, further comprising the step of averaging a series of contention values obtained for the individual station during the predefined period to provide an average contention value for the individual sender.

49. A method according to claim 47, further comprising the use of the average contention value to determine a value for the average number of deferrals incurred by the individual station.

50. A method according to claim 49, wherein said determination of the value for the average number of deferrals is made by applying the average contention to a look-up table or algorithm.

51. A method according to claim 47, further comprising the use of the average contention value to determine a figure for the average value of an individual station's backoff counter.

52. A method according to claim 51, wherein said determination of the figure for the average value of the individual station's backoff counter is made by applying the average contention value for the station to a look-up table or algorithm.

53. A method according to claim 47, further comprising the steps of obtaining all contention values during a predefined period and averaging the contention values to determine an average contention value for the wireless LAN.

54. A method according to claim 53, further comprising the step of determining a probability factor for a collision on the wireless LAN from the determined average contention value for the LAN.

55. A method according to claim 54, wherein the analyser is adapted to determine said probability factor by applying said average contention value to a look-up table or algorithm.

56. A method for determining at least one performance value for a wireless LAN, comprising the steps of:
receiving a sequence of frames, including a first frame, transmitted over the wireless LAN, the frames including packets and headers,
selectively extracting frame information from the packets and headers of individual frames received during a predetermined period beginning with receipt of the first frame, the frame information including a sender identifier for each individual frame and a retry flag indicating whether the individual frame was being retransmitted because of a previous transmission failure, and
identifying types of transmission failure by distinguishing between failures arising from transmission errors and failures arising from collision errors by reference to the degree of correlation between retransmitted frames, using an identification of transmission failures to provide the performance value, and wherein the performance value further comprises a contention value to minimize collisions upon entry onto the wireless LAN when transmissions are sent from a plurality of individual stations.

57. A method according to claim 56, wherein the at least one performance value comprises a transmission error value for at least one station, and the method comprises the further step of totalling the number of transmission errors identified for the at least one station within the predetermined period to provide said transmission error value for the station.

58. A method according to claim 56, wherein the at least one performance value comprises a collision value for at least one station, and the method comprises the further step of totalling the number of collisions identified for the station within a predetermined period to provide said collision value for the station.

* * * * *